United States Patent
Ucar et al.

(10) Patent No.: US 11,597,395 B2
(45) Date of Patent: Mar. 7, 2023

(54) SYSTEMS AND METHODS TO MANAGE VEHICLES UNDER ANOMALOUS DRIVING BEHAVIOR

(71) Applicant: Toyota Motor Engineering & Manufacturing North America, Inc., Plano, TX (US)

(72) Inventors: Seyhan Ucar, Mountain View, CA (US); Baik Hoh, Mountain View, CA (US); Kentaro Oguchi, Mountain View, CA (US)

(*) Notice: Subject to any disclaimer, the term of this patent is extended or adjusted under 35 U.S.C. 154(b) by 65 days.

(21) Appl. No.: 17/022,956

(22) Filed: Sep. 16, 2020

(65) Prior Publication Data

US 2022/0080977 A1    Mar. 17, 2022

(51) Int. Cl.
  *B60W 40/09*    (2012.01)
  *G06N 20/00*    (2019.01)

(52) U.S. Cl.
  CPC ......... *B60W 40/09* (2013.01); *G06N 20/00* (2019.01); *B60W 2540/30* (2013.01); *B60W 2554/4046* (2020.02); *B60W 2556/10* (2020.02); *B60W 2556/55* (2020.02)

(58) Field of Classification Search
  CPC ............. B60W 40/09; B60W 2556/10; B60W 2556/55; B60W 2554/4046; B60W 2540/30; G06N 20/00
  USPC ........................................................ 340/439
  See application file for complete search history.

(56) References Cited

U.S. PATENT DOCUMENTS

| | | | |
|---|---|---|---|
| 8,350,696 B2 | 1/2013 | McClellan et al. | |
| 8,903,593 B1 | 12/2014 | Addepalli et al. | |
| 9,147,353 B1* | 9/2015 | Slusar | G08G 1/0129 |
| 9,586,599 B2 | 3/2017 | Filev et al. | |
| 9,805,601 B1 | 10/2017 | Fields et al. | |
| 9,925,987 B1* | 3/2018 | Nguyen | G08G 1/0129 |
| 10,275,959 B2 | 4/2019 | Ricci | |
| 10,359,782 B1* | 7/2019 | Hayward | G01S 19/42 |
| 10,540,892 B1* | 1/2020 | Fields | B60W 40/09 |
| 11,059,491 B2* | 7/2021 | Nguyen | G07C 5/0816 |

(Continued)

OTHER PUBLICATIONS

Chalapathy, Raghavendra et al., "Deep Learning for Anomaly Detection: a Survey," arXiv preprint arXiv:1901.03407, 50 pages, 2019.

(Continued)

*Primary Examiner* — Zhen Y Wu
(74) *Attorney, Agent, or Firm* — Burbage Law, P.C.; Jon-Michael Burbage

(57) ABSTRACT

The disclosure includes embodiments for managing vehicles under anomalous driving behavior. In some embodiments, a method includes determining, by the processor, an ego behavior associated with the ego vehicle and a remote behavior associated with a remote vehicle. The method includes calculating a variance between the ego behavior and the remote behavior. The method includes determining a presence of an anomaly based on the variance satisfying a threshold, wherein the satisfying the threshold indicates the ego behavior is incompatible with the remote behavior. The method includes generating a driving management plan which is configured to mitigate the anomaly and is consistent with the ego behavior. The method includes implementing the driving management plan so that the threshold is no longer satisfied.

20 Claims, 16 Drawing Sheets

(56) References Cited

U.S. PATENT DOCUMENTS

| | | | |
|---|---|---|---|
| 2008/0042813 A1 | 2/2008 | Wheatley et al. | |
| 2009/0177602 A1 | 7/2009 | Ning et al. | |
| 2009/0326753 A1 | 12/2009 | Chen et al. | |
| 2010/0209890 A1 | 8/2010 | Huang et al. | |
| 2014/0099607 A1* | 4/2014 | Armitage | G07C 5/008 |
| | | | 434/66 |
| 2014/0278574 A1* | 9/2014 | Barber | B60W 40/09 |
| | | | 705/4 |
| 2016/0159366 A1* | 6/2016 | Tsuyunashi | G08G 1/16 |
| | | | 340/439 |
| 2017/0109827 A1* | 4/2017 | Huang | G07C 5/008 |
| 2017/0200061 A1* | 7/2017 | Julian | G07C 5/0866 |
| 2018/0053093 A1 | 2/2018 | Olabiyi et al. | |
| 2018/0164825 A1* | 6/2018 | Matus | B60W 30/00 |
| 2019/0100216 A1* | 4/2019 | Volos | G01S 19/42 |
| 2019/0143992 A1* | 5/2019 | Sohn | G05D 1/0214 |
| | | | 701/23 |
| 2019/0220011 A1* | 7/2019 | Della Penna | G06V 20/58 |
| 2019/0337512 A1* | 11/2019 | Tahmasbi-Sarvestani | |
| | | | B60W 30/0956 |
| 2020/0216080 A1 | 7/2020 | Soltanian et al. | |
| 2020/0300647 A1* | 9/2020 | Yurdakul | B60T 7/18 |

OTHER PUBLICATIONS

Ucar, Seynan et al., "Management of Anomalous Driving Behavior," IEEE Vehicular Networking Conference (VNC), 4 pages, 2019.

* cited by examiner

SYSTEMS AND METHODS TO MANAGE VEHICLES UNDER ANOMALOUS DRIVING BEHAVIOR

BACKGROUND

The specification relates to managing vehicles under anomalous driving behavior ("anomalous driving behavior" or "anomalous behavior").

An anomaly may include an action done in an unusual time (e.g., relative to a typical time for a particular geographic location) or an unusual location (e.g., relative to a typical location). For example, an anomaly includes an unusual action that does not typically occur or infrequently occurs relative to the types of actions that are typical for a particular geographic location. An occurrence of an anomaly in a roadway environment may jeopardize safety of various roadway participants (e.g., vehicles, drivers, passengers, pedestrians, bikers, etc.). The occurrence of the anomaly may also reduce efficiency of a transportation system in the roadway environment.

SUMMARY

In some embodiments, an anomaly occurs when drivers of different sensibilities are driving proximate to each other in a roadway environment. For example, if a tentative and inexperienced driver is on a roadway way with several experienced drivers that are driving aggressively, then this is an anomaly from the perspective of the inexperienced driver because the driving behavior of the experienced drivers may cause them concern and lead to indecision or poor decision making. This may also be an anomaly from the perspective of the experienced driver since the inexperienced driver is driving indecisively and their next driving decision is difficult to anticipate. For example, the experienced driver in the presence of the indecisive inexperienced driver may think "what will their next driving maneuver be, and when will they do it?" The driver also struggles to determine their future driving maneuvers in the presence of drivers having different capabilities from their own. Accordingly, an example problem includes the difficulty of identifying anomalies based on the deviation in the capabilities of different drivers and determining a driving management plan describing future driving maneuvers which will mitigate the negative effect of the anomaly. The embodiments of the anomaly managing client described herein solve this problem as well as others.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by a processor of an ego vehicle, the method including: determining, by the processor, an ego behavior associated with the ego vehicle and a remote behavior associated with a remote vehicle (as used herein, behavior includes one or more of the following: a driving pattern of the drivers; a driving attitude of the drivers; a driving capability of the drivers; and any other variable described herein with reference to behavior data); calculating a variance between the ego behavior and the remote behavior; determining a presence of an anomaly based on the variance satisfying a threshold, where the satisfying the threshold indicates the ego behavior is incompatible with the remote behavior; generating a driving management plan which is configured to mitigate the anomaly and is consistent with the capabilities of the ego driver; and implementing the driving management plan so that the threshold is no longer satisfied. Other embodiments of this aspect include corresponding computer systems, apparatus, and computer programs recorded on one or more computer storage devices, each configured to perform the actions of the methods.

Implementations may include one or more of the following features. The method where the ego behavior describes a driving ability of a first driver of the ego vehicle and the remote behavior describes the driving ability of a second driver of the remote vehicle and the presence of the anomaly is determined based on the variance in the driving abilities of the first driver and the second driver. The method where the ego behavior describes a driving habit of a first driver of the ego vehicle and the remote behavior describes the driving habit of a second driver of the remote vehicle and the presence of the anomaly is determined based on the variance in the driving habits of the first driver and the second driver. The method where the ego vehicle is a hub of a vehicular micro cloud. The method where the ego behavior and the remote behavior are determined by the processor executing a machine learning algorithm. The method where the ego behavior and the remote behavior are determined by the processor executing a time series analysis algorithm. The method where the ego behavior and the remote behavior are determined by the processor executing a digital twin simulation. The method where implementing the driving management plan includes modifying an operation of an autonomous driving system of the ego vehicle so that the ego vehicle executes a driving maneuver consistent with the driving management plan. In some embodiments, the method includes causing an electronic system (e.g., electronic display, speaker system) to provide instructions to the driver to request that the driver perform maneuvers consistent with the driving management plan. Implementations of the described techniques may include hardware, a method or process, or computer software on a computer-accessible medium.

One general aspect includes a system of an ego vehicle including: a computer system including a non-transitory memory storing computer code which, when executed by the computer system, causes the computer system to execute steps including: determining, by the computer system, an ego behavior associated with the ego vehicle and a remote behavior associated with a remote vehicle; calculating a variance between the ego behavior and the remote behavior; determining a presence of an anomaly based on the variance satisfying a threshold, where the satisfying the threshold indicates the ego behavior is incompatible with the remote behavior; generating a driving management plan which is configured to mitigate the anomaly; and implementing the driving management plan so that the threshold is no longer satisfied. Other embodiments of this aspect include corresponding computer systems, apparatus, and computer programs recorded on one or more computer storage devices, each configured to perform the actions of the methods.

Implementations may include one or more of the following features. The system where the ego behavior describes a driving ability of a first driver of the ego vehicle and the remote behavior describes the driving ability of a second driver of the remote vehicle and the presence of the anomaly is determined based on the variance in the driving abilities of the first driver and the second driver. The system where the ego behavior describes a driving habit of a first driver of the ego vehicle and the remote behavior describes the driving habit of a second driver of the remote vehicle and the presence of the anomaly is determined based on the variance in the driving habits of the first driver and the second driver. The system where the ego vehicle is a hub of a vehicular micro cloud. The system where the ego behavior and the remote behavior are determined by the computer system executing a machine learning algorithm. The system where the ego behavior and the remote behavior are determined by the computer system executing a time series analysis algorithm. The system where the ego behavior and the remote behavior are determined by the computer system executing a digital twin simulation. Implementations of the described techniques may include hardware, a method or process, or computer software on a computer-accessible medium.

One general aspect includes a computer program product including computer code stored on a non-transitory memory of an ego vehicle, where the computer code is operable, when executed by a processor, to cause the processor to execute steps including: determining, by the processor, an ego behavior associated with the ego vehicle and a remote behavior associated with a remote vehicle; calculating a variance between the ego behavior and the remote behavior; determining a presence of an anomaly based on the variance satisfying a threshold, where the satisfying the threshold indicates the ego behavior is incompatible with the remote behavior; generating a driving management plan which is configured to mitigate the anomaly; and implementing the driving management plan so that the threshold is no longer satisfied. Other embodiments of this aspect include corresponding computer systems, apparatus, and computer programs recorded on one or more computer storage devices, each configured to perform the actions of the methods.

Implementations may include one or more of the following features. The computer program product where the ego behavior describes a driving ability of a first driver of the ego vehicle and the remote behavior describes the driving ability of a second driver of the remote vehicle and the presence of the anomaly is determined based on the variance in the driving abilities of the first driver and the second driver. The computer program product where the ego behavior describes a driving habit of a first driver of the ego vehicle and the remote behavior describes the driving habit of a second driver of the remote vehicle and the presence of the anomaly is determined based on the variance in the driving habits of the first driver and the second driver. The computer program product where the ego vehicle is a hub of a vehicular micro cloud. The computer program product where the ego behavior and the remote behavior are determined by the processor executing a time series analysis algorithm. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include Advanced Driver Assistance Systems (ADAS) systems or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIG. 8.

Figure 1:
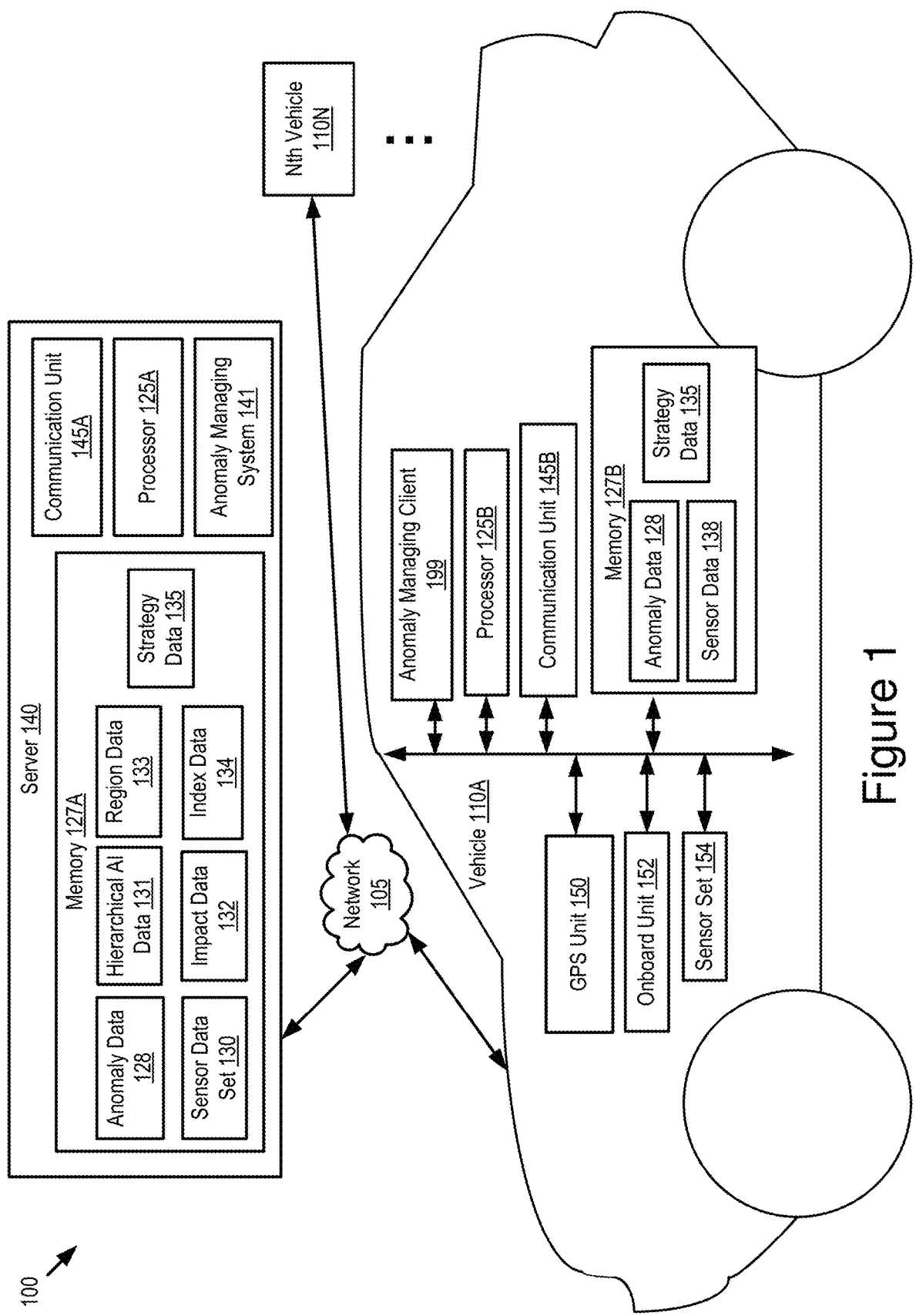
FIG. 1 is a block diagram illustrating an operating environment for an anomaly managing system and an anomaly managing client according to some embodiments.
Figure 7:
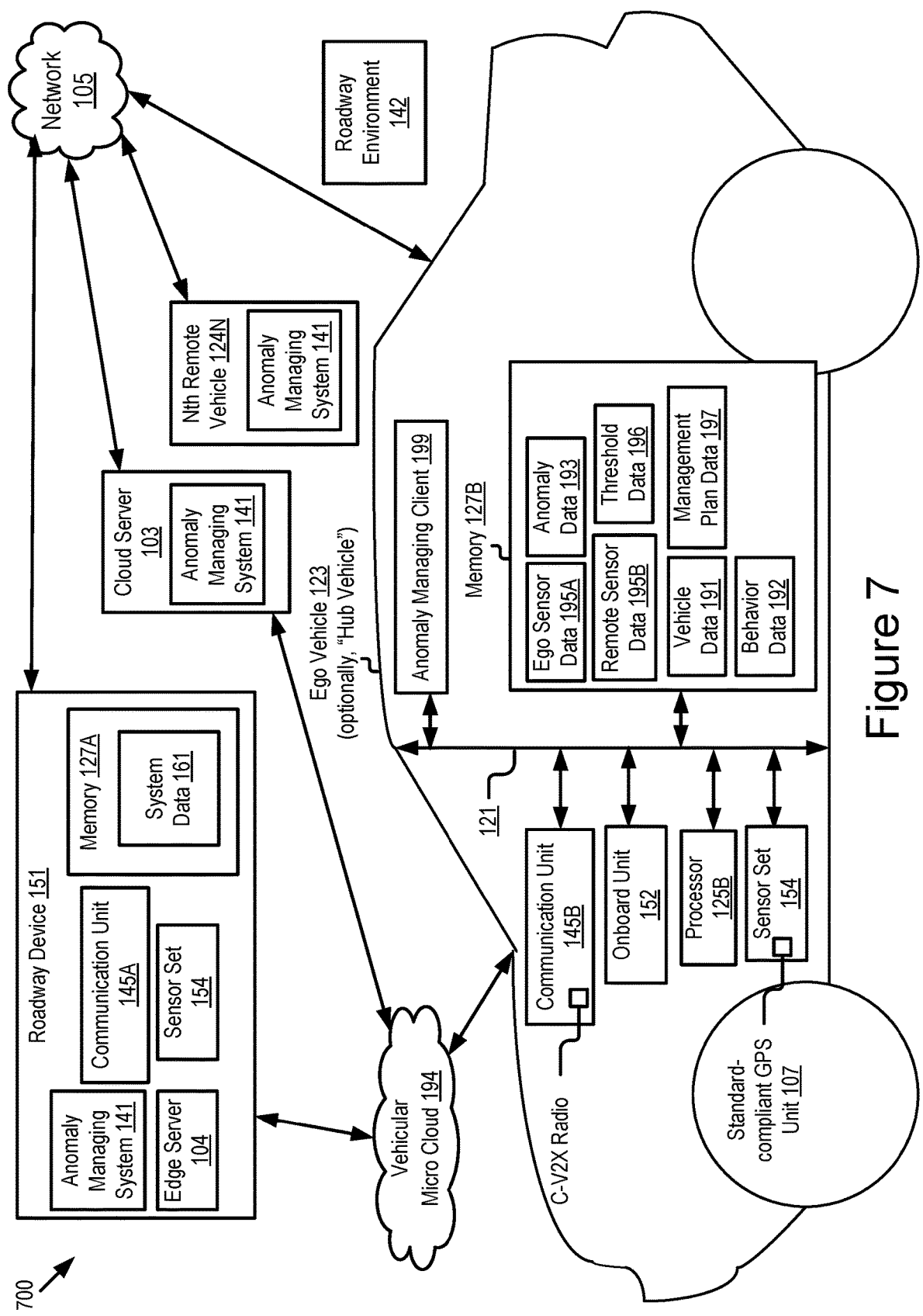
FIG. 7 is a block diagram illustrating an operating environment for an anomaly managing system and an anomaly managing client according to some embodiments.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1 and FIG. 7).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping drivers to identify scenarios where they are driving in the presence of drivers having different capabilities from their own, which is an example of an anomaly, and providing the driver with a driving management plan that describes future driving maneuvers their vehicle is recommended take in order to mitigate the negative effect of the anomaly.

Vehicles use their onboard sensors and computing resources to execute perception algorithms that inform them about the objects that are in their environment, where these objects are located in their environment, and various measurements about these objects (e.g., speed, heading, path history, etc.).

A detection of an anomaly in a roadway environment can be implemented through different ways such as using machine learning algorithms, deep learning algorithms or misbehavior detection approaches via trust management or voting. However, merely the detection of the anomaly is not sufficient to mitigate an effect of the anomaly. Entities that are near the anomaly (e.g., behind, or ahead of the anomaly) may need to be directed with proper control strategies so that the effect of the anomaly is minimized. The determination of which entities are affected by the anomaly and which control strategies are to be provided to the different entities is a challenging task.

Described herein are embodiments of an anomaly managing system and an anomaly managing client. In some embodiments, these elements are operable to work together to manage a group of connected vehicles to mitigate, reduce, or avoid an anomaly that occurs in a roadway environment. In some embodiments, these elements are operable manage entities that are affected by the anomaly (referred to as "anomaly-affected entities" hereinafter). As a result, an effect of the anomaly in the roadway environment can be minimized in some embodiments.

The Heterogenous Driver Capability Problem

An example of a heterogeneous driver capability problem is now described. In some embodiments, an anomaly occurs when drivers of different capabilities are driving proximate to each other in a roadway environment. For example, if a tentative and inexperienced driver is on a roadway way with several experienced drivers that are driving aggressively, then this is an anomaly from the perspective of the inexperienced driver because the driving behavior of the experienced drivers may cause them concern and lead to indecision or poor decision making. This may also be an anomaly from the perspective of the experienced driver since the inexperienced driver is driving indecisively and their next driving decision is difficult to anticipate.

Described herein are embodiments of an anomaly managing system and an anomaly managing client. In some embodiments, these elements are operable to work together to provide numerous benefits including, among other things, solving the heterogeneous driver capability problem.

This patent application is related to U.S. patent application Ser. No. 16/567,974 entitled "Managing Anomalies and Anomaly Affected Entities" filed on Sep. 11, 2019, the entirety of which is herein incorporated by reference.

Vehicle Cloudification

A vehicular micro cloud includes a group of connected vehicles that communicate with one another via V2X messages to provide a location data correction service. Optionally, a vehicular micro cloud is formed by the anomaly managing client in some embodiments to assist the anomaly managing client to improve the functionality of the anomaly managing client. For example, the anomaly managing client of a single vehicle detects an anomaly (e.g., a variance in the driving capabilities of two or more drivers which satisfies a threshold) and then forms a vehicular micro cloud in order to confirm the presence of the anomaly or take some other action that improves the functionality of the anomaly managing client. Vehicular micro clouds are now described in more detail.

The vehicular micro cloud includes multiple members. A member of the vehicular micro cloud includes a connected vehicle that sends and receives V2X messages via the serverless ad-hoc vehicular network. In some embodiments, the members of the serverless ad-hoc vehicular network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadside device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set. An operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but receives a benefit of a location data correction service for location data that is provided by the members of the serverless ad-hoc vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hoc vehicular network. In this way, the serverless ad-hoc vehicular network is operable to improve the operation of the legacy vehicle, which in turn increases the safety of the sensor rich vehicles that are traveling in a vicinity of the legacy vehicle.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "micro vehicular cloud" since a micro vehicular cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "network tasks" if plural, or a "network task" if singular.

In some embodiments, a network task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a network task is collaboratively performed by the plurality of members executing computing processes in parallel which are configured to complete the execution of the network task.

In some embodiments, a vehicular micro cloud includes a plurality of members that execute computing processes whose completion results in the execution of a network task. For example, the serverless ad-hoc vehicular network provides a network task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud. In some embodiments, the payload includes any of the digital data described herein. For example, the payload includes system data. The system data includes digital data that describes any of the digital data described herein. An example of the system data includes the system data 161 depicted in FIG. 7.

Figure 8:
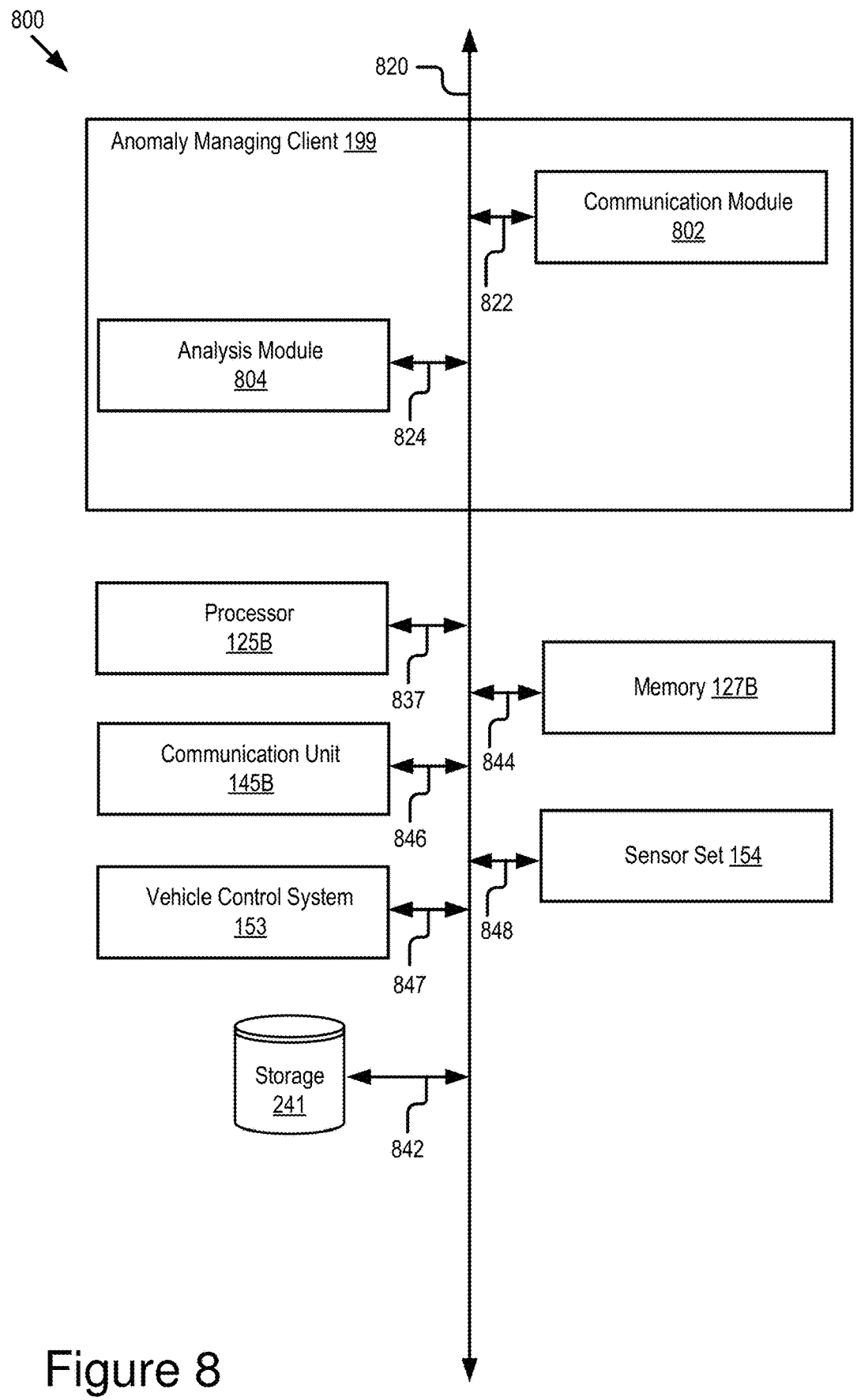
FIG. 8 is a block diagram illustrating an example computer system including the anomaly managing client according to some embodiments.

As used herein, the term "vehicle" refers to a connected vehicle. For example, the ego vehicle and remote vehicle depicted in FIGS. 1 and 8 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, one or more of the anomaly managing system and the anomaly managing client work together to improve the performance of a network because it beneficially takes steps enable the completion of vehicular micro cloud tasks.

In some embodiments, the anomaly managing client is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 142 depicted in FIG. 7. As depicted, the roadway environment 142 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 142 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of an anomaly managing client. For example, in addition to the ego vehicle, some or all of the remote vehicles include an onboard unit having an instance of the anomaly managing client installed therein.

In some embodiments, the ego vehicle and one or more of the remote vehicles are members of a vehicular micro cloud.

In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 7.

Accordingly, multiple instances of the anomaly managing client are installed in a group of connected vehicles. The group of connected vehicles are arranged as a vehicular micro cloud. As described in more detail below, the anomaly managing client further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

In some embodiments, the ego vehicle and some or all of the remote vehicles are members of the same vehicular macro cloud but not the same nano cloud. In some embodiments, the ego vehicle and some or all of the remote vehicles are members of the same nano cloud.

A nano cloud includes a subset of the members of a vehicular micro cloud. The members of the nano cloud are assigned a sub-task to complete. In some embodiments, the members of the nano cloud are organized to form the nano cloud by a hub; the hub also assigns the members a sub-task to complete and optionally digital data describing instructions for which of the members should complete which aspects of the sub-task.

In some embodiments, each nano cloud includes digital data that describes a roster for that nano cloud. A roster for a particular nano cloud is digital data that describes which of the members of the vehicular micro cloud are assigned to be members of the particular nano cloud.

In some embodiments, an anomaly managing client creates a set of nano clouds to perform a plurality of sub-tasks. The plurality of sub-tasks are configured so that their completion will result in a completion of a vehicular micro cloud task. Each nano cloud in the set is assigned at least one sub-task from the plurality to perform. Each nano cloud includes at least one member of the vehicular micro cloud so that each nano cloud includes a membership roster. Different nano clouds in the set include different membership rosters relative to one another.

In some embodiments, V2X communication (including V2V communication) and vehicular micro clouds are not necessary for the anomaly managing client to detect an anomaly. For example, in some embodiments a single vehicle includes an anomaly managing client that detects an anomaly (e.g., a variance in driving behavior). The anomaly managing client of this vehicle can then trigger the formation of a vehicular micro cloud responsive to detecting the anomaly. The formation of the vehicular micro cloud is beneficial, for example, because the additional sensors and computing resources of the vehicular micro cloud improve anomaly detection accuracy. The anomaly managing system may then take steps to mitigate the anomaly or take some other action responsive to the anomaly and tailored to the anomaly. For example, in some embodiments the anomaly managing client executes one or more steps of one or more of the methods described herein. In some embodiments, the anomaly managing client does not use V2X communication or vehicular micro clouds when providing its functionality. Accordingly, V2X communication and vehicular micro clouds are an optional feature of the embodiments described herein.

Hub or Hub Vehicle

In some embodiments, the anomaly managing client that executes a method as described herein (e.g., the method 300 depicted in FIG. 3, the method 900 depicted in FIG. 9, the method 1400 depicted in FIG. 14, the example general method described below, etc.) is an element of a hub or a hub vehicle. For example, the vehicular micro cloud formed by the anomaly managing client includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIGS. 1 and 8. In some embodiments, the roadway device 151 is the hub of the vehicular micro cloud 194.

In some embodiments, the anomaly managing client determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the anomaly managing client determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the membership data which vehicles such as the ego vehicle 123 and the remote vehicle 124 broadcast to one another via BSMs. In some embodiments, the membership data also includes the sensor data of the vehicle that transmits the BSM as well as some or all of the other digital data described herein as being an element of the membership data.

A vehicle's sensor data is the digital data recorded by that vehicle's onboard sensor set 154. In some embodiments, an ego vehicle's sensor data includes the sensor data recorded by another vehicle's sensor set 154; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the anomaly managing system and/or the anomaly managing client are operable to provide their functionality to operating environments and network architectures that do not include a server. Use of servers may be problematic in some applications because they create latency. For example, some prior art systems require that groups of vehicles relay all their messages to one another through a server. By comparison, the use of server is an optional feature of the embodiments described herein. For example, the anomaly managing system is an element of a roadside unit that includes a communication unit 145 but not a server. In another example, the anomaly managing system is an element of another vehicle such as one of the remote vehicles 124. In some embodiments, servers are included and the vehicles calculate the latency and take actions to account for this extra latency.

In some embodiments, the anomaly managing client and/or the anomaly managing system are operable to provide its functionality even though the vehicle which includes the anomaly managing client does not have a Wi-Fi antenna as part of its communication unit. By comparison, some of the existing solutions require the use of a Wi-Fi antenna in order to provide their functionality. Because the anomaly managing client and/or the anomaly managing system do not require a Wi-Fi antenna, they are able to provide their functionality to more vehicles, including older vehicles without Wi-Fi antennas.

In some embodiments, the anomaly managing client and/or the anomaly managing system are operable to provide their functionality even though the vehicle which includes the anomaly managing client does not have a V2X radio as part of its communication unit. By comparison, some of the existing client require the use of a V2X radio in order to provide their functionality. Because the anomaly managing client and/or the anomaly managing system do not require a V2X radio, they are able to provide their functionality to more vehicles, including older vehicles without V2X radios.

In some embodiments, the anomaly managing client includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the anomaly managing client includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the anomaly managing client manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the anomaly managing client is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, any group of vehicles that includes a server or whose functionality incorporates a server is not a vehicular micro cloud as this term is used herein.

In some embodiments, a vehicular micro cloud formed by an anomaly managing client is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the anomaly managing client is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 7 depicts a server in an operating environment that includes the anomaly managing system, the server is an optional feature of the operating environment. An example of a preferred embodiment of the anomaly managing system does not include the server in the operating environment which includes the anomaly managing system and/or the anomaly managing client.

In some embodiments, the anomaly managing client enables a group of vehicles to perform computationally expensive tasks that could not be completed by any one vehicle in isolation.

In some embodiments, each nano cloud included in a vehicular micro cloud includes its own hub which is responsible for organizing the operation of the members that are included in that particular nano cloud. For example, the hub of a nano cloud is responsible for maintaining and updating the roster for the hub, monitoring the performance of the sub-task, monitoring the efficiency of the completion of the sub-task, monitoring when members join or leave the vehicular micro cloud, communicating with other hubs of nano clouds to facilitate updates to the roster of the nano clouds to optimize performance of the sub-task or compensate for changes of circumstance caused by the membership in the vehicular micro cloud changing.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 107 depicted in FIG. 7.

In some embodiments, the connected vehicle described herein, and depicted in FIGS. 1 and 8, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 7 is a C-V2X radio which is operable to send and receive C-V2X wireless messages on the upper 30 MHz of the 5.9 GHz band (i.e., 5.895-5.925 GHz). In these embodiments, the anomaly managing client 199 and/or the anomaly managing system 141 are operable to cooperate with the C-V2X radio and provide their functionality using the content of the C-V2X wireless messages.

In some of these embodiments, some or all of the digital data described herein is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

In some embodiments, the anomaly managing client uses vehicular networks in order to provide its functionality. However, in some embodiments the anomaly managing client does not use vehicular networks to provide its functionality. Accordingly, vehicular networks are an optional feature of the embodiments described herein. For example, in some embodiments a first vehicle includes an anomaly managing client and this anomaly managing client is operable to determine the capabilities of a first driver of the first vehicle and measure a deviation between the first vehicle and other vehicles in order to identify an anomaly. In some embodiments, the anomaly managing client measures a deviation in the capabilities of the first driver of the first vehicle and one or more of the following when determining that an anomaly is present: a leading vehicle that precedes the first vehicle; and a following vehicle that follows the first vehicle. If the deviation among these driver satisfies a threshold, then the anomaly managing client determines that an anomaly is present. The embodiment described above does not require a vehicular network, although vehicular networks might be incorporated into this functionality in order to provide increased accuracy for the detection of anomalies.

Examples of vehicular networks are now described according to some embodiments. In some embodiments, the anomaly managing system and/or the anomaly managing client utilize a vehicular network. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the anomaly managing client includes software installed in an onboard unit of a connected vehicle. This software is the "anomaly managing client" described herein. In some embodiments, the anomaly managing system includes software installed in an edge server or a roadside device (e.g., a roadside unit). This software is the "anomaly managing system" described herein. The anomaly managing system and the anomaly managing client cooperate to provide the functionality described herein. For example, the anomaly managing system and the anomaly managing client cooperate to execute one or more of the methods described herein.

An example operating environment for the embodiments described herein includes an ego vehicle and, optionally, one or more remote vehicles. The ego vehicle the remote vehicle are connected vehicles having communication units that enable them to send and receive wireless messages via one or more vehicular networks. In some embodiments, the ego vehicle and the remote vehicle include an onboard unit having an anomaly managing client stored therein. An example of a preferred embodiment of the anomaly managing client includes a serverless operating environment. A serverless operating environment is an operating environment which includes at least one anomaly managing client, at least one anomaly managing system, and does not include a server.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example General Method

Figure 3:
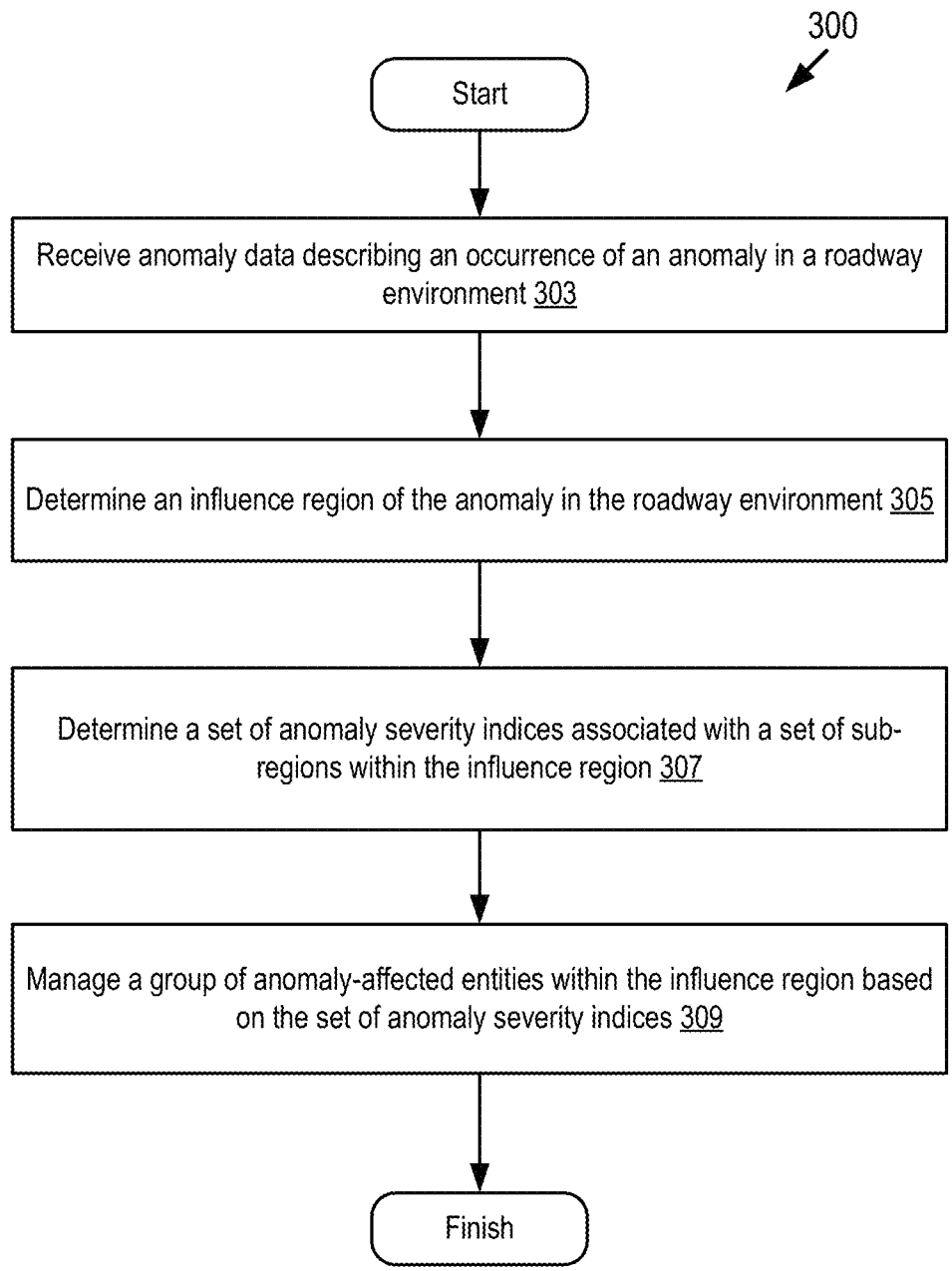
FIG. 3 depicts a method for managing an anomaly and a group of entities affected by the anomaly according to some embodiments.
Figure 9:
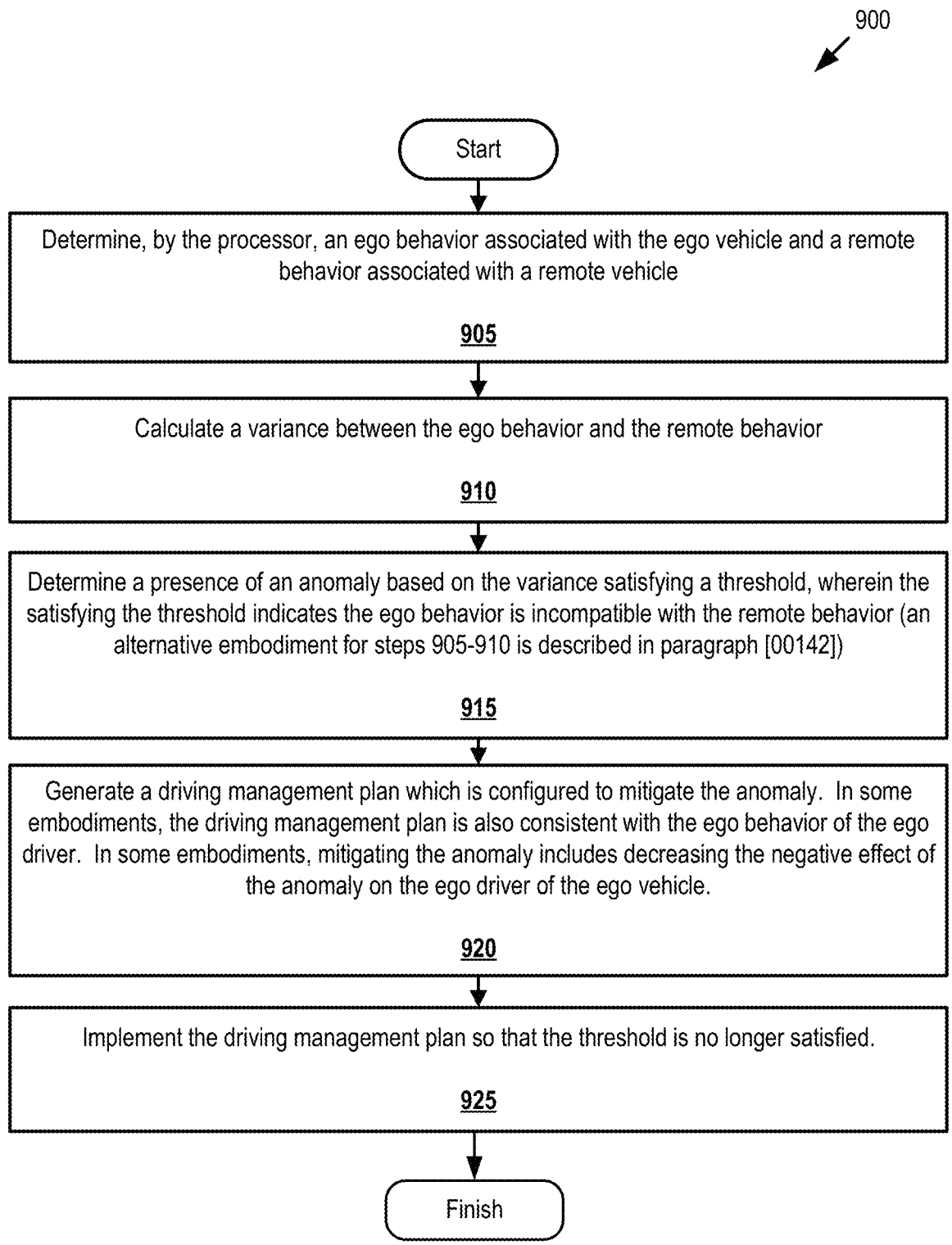
FIG. 9 depicts a method for managing driving behavior in a roadway environment that includes anomalous driving behavior according to some embodiments.
Figure 14:
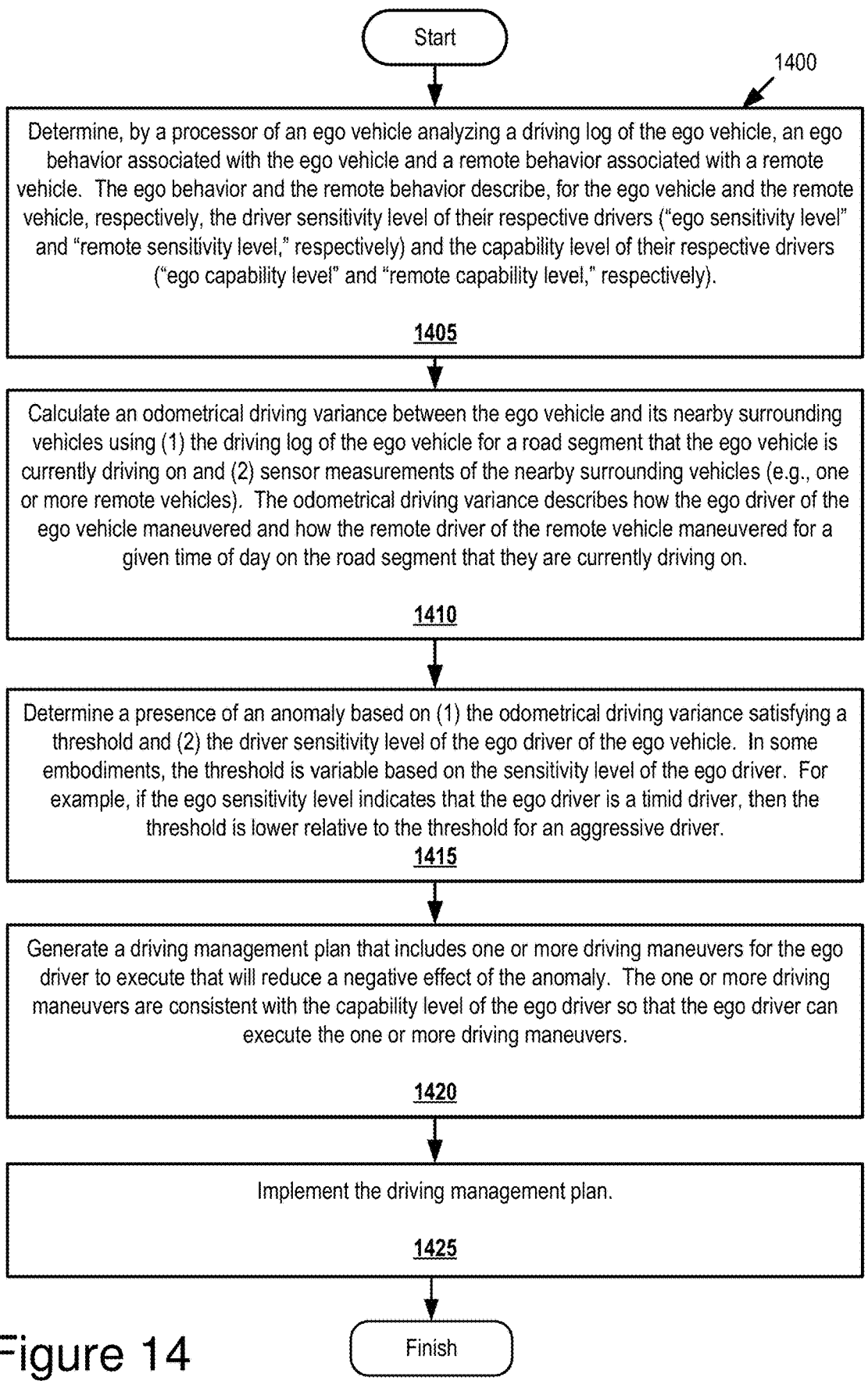
FIG. 14 depicts a method for mitigating anomalous driving behavior according to some embodiments.

In some embodiments, the anomaly managing client includes code and routines that are operable, when executed by a processor of the onboard unit, to cause the processor to execute one or more of the steps of the method 300 depicted in FIG. 3, the method 900 depicted in FIG. 9, the method 1400 depicted in FIG. 14, or any other method described herein, including the example general method.

In some embodiments, the anomaly managing system includes code and routines that are operable, when executed by a processor of a computer system, to cause the processor to execute one or more of the steps of the method 300 depicted in FIG. 3, the method 900 depicted in FIG. 9, the method 1400 depicted in FIG. 14, or any other method described herein, including the example general method.

An example general method which is now described according to some embodiments. The steps of the example general method may be executed in any order. In some embodiments, some of the steps are skipped or omitted. Any step of the example general method can be executed by the anomaly managing client and/or the anomaly managing system. As described herein with reference to the embodiments that execute the example general method, the ego vehicle is a hub vehicle of a vehicular micro cloud. The steps are now described according to some embodiments.

Step 1: Generate ego sensor data. The ego sensor data includes digital data that describe the sensor measurements recorded by the sensor set of the ego vehicle. An example of the ego sensor data according to some embodiments includes the ego sensor data 195A depicted in FIG. 7.

Step 2: Receive remote sensor data from remote vehicles. The remote sensor data includes digital data that describe the sensor measurements recorded by the sensor set of the remote vehicle. An example of the remote sensor data according to some embodiments includes the remote sensor data 195B depicted in FIG. 7.

In some embodiments, the ego vehicle does not receive remote sensor data from remote vehicles. For example, in some embodiments the ego vehicle can use its own onboard sensors to generate ego sensor data that describes sensor measurements about the remote vehicle that are equivalent to those that would be described by the remote sensor data. This is beneficial, for example, if the remote vehicle is not a connected vehicle.

Step 3: Fuse the remote sensor data and the ego sensor data. This is an optional step in some embodiments.

Step 4: Analyze the ego sensor data and the remote sensor data to identify, within this digital data, the vehicles that are present in the roadway environment. The output of this step is vehicle data. Vehicle data includes digital data that uniquely identifies, from among the objects that are within the roadway environment, which of these objects are vehicles in a way that is trackable over time. An example of the vehicle data according to some embodiments includes the vehicle data 191 depicted in FIG. 7.

In some embodiments, the memory of the ego vehicle stores digital data describing as set of object priors. In some embodiments, the anomaly managing client analyzes the ego sensor data, the remote sensor data, and the set of object priors to uniquely identify, based on the sensor measurements and the object priors, which of the objects within the roadway environment are vehicles.

In some embodiments, the vehicle data describes a set of unique identifiers for each vehicle in the roadway environment as well as sensor measurements for that vehicle at a set of times. For example, the vehicle data describes one or more of the following on a vehicle-by-vehicle basis for the vehicles that are located in the roadway environment: a unique identifier; geographic location(s) at a set of times; speed(s) at a set of times; acceleration(s) at a set of times, heading(s) at a set of times; and driving histories at a set of earlier times.

In some embodiments, step 3 includes vehicles broadcasting BSMs that includes, as a payload for the BSMs, vehicle data describing this information for each vehicle and including a unique identifier for each vehicle that broadcasts the BSMs. For example, the vehicles in the roadway environment are connected vehicles that are compliant with a standard that requires the transmission of BSMs, and part 2 of the BSMs they broadcast include self-reported vehicle data that describes information about them for the other vehicles in their vicinity.

Step 5: Analyze one or more of the ego sensor data, the remote sensor data, and the vehicle data to generate the behavior data. The behavior data includes digital data that describes, on a vehicle-by-vehicle basis, a driving pattern, a driving attitude, or a driving ability of the drivers of the vehicles that are described by the vehicle data.

In some embodiments, the behavior data includes digital data that describes the driving capability and/or driver behavior of the drivers of the vehicles that are identified by the vehicle data; these descriptions are made on a vehicle-by-vehicle basis.

For example, the behavior data includes digital data that describes one or more of the following about the drivers of vehicles on a vehicle-by-vehicle basis: whether drivers drive aggressively, whether drivers drive faster than the traffic around them, whether drivers change lanes more than normal, whether drivers tend to drive in the fast lane, whether drivers drive indecisively, whether drivers drive timidly or tentatively, whether drivers drive slower than the traffic around them, whether drivers tend to drive in the slow lane, whether drivers tend to pass other vehicles, whether drivers tend to be passed by other vehicles, whether drivers tend to exceed the speed limit, whether drivers tend to obey the speed limit, whether drivers tend to drive at dangerously slow speeds, whether drivers tend to over-accelerate, whether drivers tend to accelerate slowly, whether driver tend to display normal and safe driving habits, etc.

In some embodiments, the behavior data includes digital data that describes an estimate of the experience level or skill level of these drivers on a vehicle-by-vehicle basis. For example, the behavior data describes whether a driver is at an intermediate skill level, intermediate skill level, or advanced skill level. In some embodiments, the behavior data includes digital data that describes one or more of the following on a vehicle-by-vehicle basis: a driver sensitivity level; and a driver's driving capability level. The behavior data is determined based on analysis of the ego sensor data and, optionally, the remote sensor data. The driver sensitivity level describes how a driver would perceive a given anomaly (e.g., whether the driver perceives the anomaly as being serious or unimportant). The driver's driving capability level describes the driver's skill at operating their vehicle. The driver's driving capability level indicates which types of driving maneuvers the driver can execute or not execute. In some embodiments, the anomaly managing client maintains a driving log. A driving log includes digital data that includes historical sensor measurements about a driver which indicates their driving capability level (e.g., whether they are timid/cautious, aggressive, etc.). The driving log is comprised of historical sensor data and stored in the memory of the ego vehicle.

In some embodiments, the anomaly managing client includes an analysis module that receives one or more of the ego sensor data, the remote sensor data, and the vehicle data as inputs and then outputs the behavior data. In some embodiments, the analysis module provides this functionality using a set of digital twin simulations. For example, the analysis module includes code and routines that are operable to execute a set of digital twin simulations that use the ego sensor data, the remote sensor data, and the vehicle sensor data as inputs and output the behavior data on a vehicle-by-vehicle basis. Examples of the digital twin simulations are described in more detail below.

In some embodiments, the analysis module provides its functionality using a machine learning algorithm. For example, the analysis module includes code and routines that include a machine learning algorithm that receives the vehicle data as an input (or possibly multiple instances of vehicle data over a period of time), analyzes the vehicle data using a machine learning process to determine information about the drivers on a vehicle-by-vehicle basis, and then outputs the behavior data.

In some embodiments, the analysis module provides its functionality using a dynamic time warping algorithm. For example, the analysis module includes code and routines that include a dynamic time warping algorithm that receives the vehicle data as an input (or possibly multiple instances of vehicle data over a period of time), analyzes the vehicle data using a dynamic time warping process to determine information about the drivers on a vehicle-by-vehicle basis, and then outputs the behavior data.

In some embodiments, the analysis module includes a time series analysis algorithm which analyzes some or all of the data described herein. In some embodiments, the time series analysis algorithm analyzes the data using dynamic time warping analysis. In some embodiments, the dynamic time warping analysis outputs a similarity score describing a similarity in the driving capabilities of two or more drivers (e.g., a first driver of the ego vehicle and one or more of a second driver of a leading vehicle driving in front of the ego vehicle and a third driver of a following vehicle driving behind the ego vehicle). The similarity score describes, for example, how much difference exists in the capabilities of these drivers based on a time series of observed sensor data (e.g., ego sensor data, remote sensor data, other digital data). The similarity score is described by time series data which includes digital data describing the similarity score which is stored in the memory of the ego vehicle. In some embodiments, the anomaly managing client compares the similarity score to a threshold described by the threshold data to determine whether the similarity score satisfies a threshold. If the threshold is satisfied, then the anomaly managing client determines that an anomaly is present. This paragraph describes an alternative embodiment for determining a presence of an anomaly (see, e.g., steps 905, 910, and 915 of the method 900 depicted in FIG. 9). In some embodiments, the anomaly managing client generates a driving management plan and implements the driving management plan after determining the presence of the anomaly based on the similarity score.

In some embodiments, the anomaly managing client reports the behavior data to the anomaly managing system which is an element of an edge server. The anomaly managing system builds and maintains a data structure of behavior data. Vehicles on the roadway request behavior data for particular geographic regions or segments of a roadway. The data structure managed by the anomaly managing system organizes the behavior data so that it is retrievable using queries that specify geographic regions or roadway segments. The anomaly managing system provides V2X messages to these requesting vehicles that includes the behavior data that is responsive to their requests. In this way, the anomaly managing system provides a behavior data services to the connected vehicles of a roadway environment in some embodiments.

Step 6: Determine a presence of an anomaly in the roadway environment based on one or more of the following types of digital data: the ego sensor data; the remote sensor data; the vehicle data; the behavior data; and threshold data. The output of this step is anomaly data.

The anomaly data includes digital data that describes a detected anomaly in the roadway environment and the severity of the anomaly. An example of the anomaly data according to some embodiments includes the anomaly data 193 depicted in FIG. 7.

The threshold data includes digital data that describes any threshold described herein. An example of the threshold data according to some embodiments includes the threshold data 196 depicted in FIG. 7.

In some embodiments, the anomaly managing client determines an anomaly when there is a deviation in the behavior data of two different drivers of two different vehicles that satisfies a threshold.

For example, the anomaly managing client determines that the vehicle data indicates that a first driver is indecisive and second driver is aggressive, and the deviation between these drivers capabilities or driving habits satisfies a threshold defined by the threshold data. The anomaly managing client determines that an anomaly is present in the roadway environment and outputs anomaly data describing the anomaly. Other examples are possible; the example provided in this paragraph is not intended to be limiting.

Step 7: Determine, based on the anomaly data, a driving management plan that is operable to mitigate the anomaly if followed. The output of this step is management plan data. The management plan data includes digital data that describes the driving management plan that is operable to mitigate the anomaly if followed. An example of the management plan data according to some embodiments includes the management plan data 197 depicted in FIG. 7.

In some embodiments, the driving management plan includes a set of recommendations for how to operate a vehicle so that the anomaly described by the anomaly data is mitigated or reduced. In some embodiments, an anomaly is mitigated if the threshold is not satisfied after implementation of the driving management plan.

Step 8: In some embodiments, the management plan data is provided to an ADAS system or autonomous driving system of the ego vehicle so that one or more of these onboard systems execute driving maneuvers that implement the driving management plan. In some embodiments, the ego vehicle includes speakers, electronic displays, or other electronic devices that inform the driver about steps to take in order to implement the driving management plan. In some embodiments, the management plan data 197 is transmitted to other vehicles affected by the anomaly via a V2X message that is transmitted by the communication unit of the ego vehicle.

In some embodiments, the driving maneuvers described by the management plan data are consistent with the behavior data for the driver of the ego vehicle. For example, if the driver is driving in the right-most lane the majority of the time, then this is reflected by the behavior data for this driver. In this situation, the anomaly managing client generates management plan data that does not require the driver to execute driving maneuvers that are inconsistent with their behavior data. For example, the driving maneuvers described by the management plan data in this situation do not require the driver to execute driving maneuvers that require them to travel in a different lane than the right-most lane. Instead, the driving management plan data describes other maneuvers such as driving slower within legal restrictions, driving faster within legal restrictions, stopping in a breakdown lane of the roadway until the anomaly passes, etc. Accordingly, the anomaly managing client is operable to determine the driving capabilities of a driver and use this determination to generate a driving management strategy that decreases the negative effect of anomalous driving behavior by other drivers.

In some embodiments, the ego vehicle is a hub vehicle of a vehicular micro cloud and the vehicular micro cloud executes a vehicular task that includes executing driving maneuvers that are consistent with the driving management plan described by management plan data. In some embodiments, the vehicular micro cloud is formed by the anomaly managing client responsive to detecting the anomaly for the purpose of executing the driving management plan and mitigating the anomaly. In some embodiments, the anomaly managing client re-executes steps 1-6 and dissolves the vehicular micro cloud responsive to determining that the threshold is no longer satisfied. In some embodiments, the vehicular micro cloud forms a set of nano clouds that each execute different parts of the driving management plan in order to mitigate the anomaly.

In some embodiments, the anomaly management client tracks changes in driver sensitivities over time. The anomaly management client determines the sensitivities of the drivers of the vehicles and if the deviation among vehicles is larger than the learned behavior levels from earlier times, the anomaly management client determines to inform the driver with driving maneuvers and timing for these driving maneuvers so that the driver can mitigate the impact of the anomalous behavior.

Digital Twin Simulations

In some embodiments, the ego vehicle includes a sensor set. The sensors of the sensor set are operable to collect ego sensor data. The sensors of the sensor set include any sensors that are necessary to measure and record the measurements described by the ego sensor data. In some embodiments, the sensor data includes any sensor measurements that are necessary to generate the other digital data stored by the memory 127. In some embodiments, the ego sensor data 195A includes digital data that describes any sensor measurements that are necessary for the anomaly managing client and/or the anomaly managing system to provide its functionality as described herein with reference to the methods described herein.

In some embodiments, the sensor set includes any sensors that are necessary to record ego sensor data that describes the roadway environment in sufficient detail to create a digital twin of the roadway environment. In some embodiments, the anomaly managing client and/or the anomaly managing system generates the set of nano clouds and assigns sub-tasks to the nano clouds based on the outcomes observed by the anomaly managing client and/or the anomaly managing system during the execution of a set of digital twins that simulate the real-life circumstances of the ego vehicle.

For example, in some embodiments the anomaly managing client and/or the anomaly managing system include simulation software. The simulation software is any simulation software that is capable of simulating an execution of a vehicular micro cloud task by the vehicular micro cloud. For example, the simulation software is a simulation software that is capable of conducting a digital twin simulation. In some embodiments, the vehicular micro cloud is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 142 of the real-world vehicle (e.g., the ego vehicle). The simulation software includes code and routines that are operable to execute simulations based on digital twins of real-world vehicles in the roadway environment.

In some embodiments, the simulation software is integrated with the anomaly managing client and/or the anomaly managing system. In some other embodiments, the simulation software is a standalone software that the anomaly managing client and/or the anomaly managing system can access to execute digital twin simulations to determine the best way to divide the vehicular micro cloud 194 into nano clouds and which sub-tasks to assign which nano clouds. The digital twin simulations may also be used by the anomaly managing client and/or the anomaly managing system to determine how to break down the vehicular micro cloud task into sub-tasks. For example, the driving management plan is broken down into sub-tasks and different nano clouds execute different sub-tasks so that the driving management plan is achieved.

Digital twins, and an example process for generating and using digital twins which is implemented by the anomaly managing client and/or the anomaly managing system in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

Example Overview

Referring to FIG. 1, depicted is an operating environment 100 for an anomaly managing system 141 and an anomaly managing client 199 according to some embodiments. The operating environment 100 may include one or more of the following elements: one or more vehicles 110A, . . . , 110N (e.g., referred to as vehicle 110, individually or collectively); and a server 140. These elements of the operating environment 100 may be communicatively coupled to a network 105. In practice, the operating environment 100 may include any number of vehicles 110, servers 140 and networks 105.

In some embodiments, the vehicle 110A-110N may be members of a vehicular micro cloud. Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, 5G, LTE, LTE-V2X, LTE-D2D, VoLTE, 5G-V2X or any other mobile data network. The network 105 may also include any combination of mobile data networks. Further, the network 105 may include one or more IEEE 802.11 wireless networks.

In some embodiments, the network 105 includes a C-V2X network.

The server 140 may be any server that includes one or more processors and one or more memories. For example, the server 140 may be a cloud server, an edge server, or any other type of server. In some embodiments, the server 140 may include one or more of the following elements: a processor 125A; a memory 127A; a communication unit 145A; and the anomaly managing system 141.

In some embodiments, the processor 125A and the memory 127A may be elements of a computer system (such as computer system 200 described below with reference to FIG. 2). The computer system may be operable to cause or control the operation of the anomaly managing system 141. For example, the computer system may be operable to access and execute the data stored on the memory 127A to provide the functionality described herein for the anomaly managing system 141 or its elements (see, e.g., FIG. 2).

The processor 125A includes an arithmetic logic unit, a microprocessor, a general-purpose controller, or some other processor array to perform computations and provide electronic display signals to a display device. The processor 125A processes data signals and may include various computing architectures. Example computing architectures include a complex instruction set computer (CISC) architecture, a reduced instruction set computer (RISC) architecture, or an architecture implementing a combination of instruction sets. The server 140 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The server 140 may include one or more memories 127A.

The memory 127A may store one or more of the following elements: anomaly data 128; a sensor data set 130; hierarchical AI data 131; impact data 132; region data 133; index data 134; and strategy data 135.

The anomaly data 128 may include digital data that describes an anomaly that occurs in a roadway environment. In some embodiments, the anomaly data 128 may include digital data describing a type of the anomaly, a location of the anomaly, a time when the anomaly occurs, or any other data related to the anomaly. In some embodiments, the anomaly data 128 may be received from a party (e.g., a vehicle, a server, etc.) that detects an occurrence of the anomaly.

The sensor data set 130 may include various sensor data received from various vehicles 110, roadside units or any other infrastructure devices in the roadway environment.

The hierarchical AI data 131 may include digital data that describes one or more of the following: real-life traffic information; real-time traffic information; and predicted future traffic information. The hierarchical AI data 131 can be generated based on sensor data included in the sensor data set 130. For example, the hierarchical AI data 131 includes real-time information, predicted information or a combination thereof of connected or non-connected entities present in the roadway environment. The real-time information may include data describing a current location, a current speed, and a current heading, etc., of the connected or non-connected entities. The predicted information may include data describing a predicted location, a predicted speed, and a predicted heading, etc., of the connected or non-connected entities in a future time window.

The impact data 132 can include digital data describing an impact of the anomaly in the roadway environment.

The region data 133 can include digital data describing an influence region of the anomaly.

Anomaly severity indices are now described according to some embodiments. In some embodiments the anomaly managing client 199 uses the anomaly severity indices described herein as an additional factor that is considered when determining whether or not an anomaly is present in a roadway (e.g., step 915 of the method 900 depicted in FIG. 9). For example, in some embodiments the anomaly severity index must satisfy a predetermined level and the threshold must be satisfied before an anomaly is declared as present by the anomaly managing client. However, in some embodiments the anomaly managing client 199 does not use the anomaly severity indices when providing its functionality. Accordingly, the anomaly severity indices described herein are an optional feature of the embodiments described herein. Examples of the anomaly severity indices are now described according to some embodiments.

The index data 134 can include digital data describing a set of anomaly severity indices associated with the anomaly. For example, the influence region can be divided into a set of sub-regions with each sub-region associated with a corresponding anomaly severity index so that a set of anomaly severity indices is generated for the influence region. In some embodiments, the set of anomaly severity indices may include one or more anomaly severity indices. Each anomaly severity index may indicate a different impact-severity level of the anomaly imposed on the roadway environment.

For example, the set of anomaly severity indices includes a level-1 index (ASI-1), a level-2 index (ASI-2) and a level-3 index (ASI-3) that are associated with three sub-regions within the influence region. The level-1 index indicates that an impact-severity level of the anomaly is urgent, and a first sub-region associated with the level-1 index includes a first area that is immediately around (e.g., just behind or ahead of) the anomaly. The level-2 index indicates that an impact-severity level of the anomaly is intermediate. A second sub-region associated with the level-2 index includes a second area that is following the first sub-region and further away from the anomaly when compared to the first sub-region. The level-3 index indicates that an impact-severity level of the anomaly is moderate, and a third sub-region associated with the level-3 index includes a third area that is following the second sub-region. An example of the anomaly severity indices and their associated sub-regions is illustrated with reference to FIG. 6.

In some embodiments, the index data 134 is an example of the severity that is described by the anomaly data 193 depicted in FIG. 7.

The strategy data 135 can include digital data describing a set of control strategies for managing anomaly-affected entities in the influence region. Each anomaly severity index may correspond to a corresponding control strategy. Anomaly-affected entities located in a same sub-region associated with an anomaly severity index are managed by a control strategy that corresponds to the anomaly severity index. Anomaly-affected entities located in different sub-regions are managed by different control strategies.

In some embodiments, the strategy data 135 is an example of the management plan data 197 depicted in FIG. 7.

The communication unit 145A transmits and receives data to and from the network 105 or to another communication channel. In some embodiments, the communication unit 145A may include a DSRC transceiver, a DSRC receiver and other hardware or software necessary to make the server 140 a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795:2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System", or another suitable wireless communication method.

In some embodiments, the communication unit 145A includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A may include a V2X radio. The V2X radio may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

In some embodiments, the communication unit 145A includes a C-V2X radio.

The anomaly managing system 141 includes software that is operable to manage an anomaly and anomaly-affected entities. In some embodiments, the anomaly managing system 141 may be implemented using hardware including a field-programmable gate array ("FPGA") or an application-specific integrated circuit ("ASIC"). In some other embodiments, the anomaly managing system 141 may be implemented using a combination of hardware and software. The anomaly managing system 141 may be stored in a combination of the devices (e.g., servers or other devices), or in one of the devices.

Although the anomaly managing system 141 is installed in the server 140 in FIG. 1, in some embodiments the anomaly managing system 141 may also be installed in a vehicle (e.g., a leader vehicle of a vehicle platoon, a leader vehicle of a vehicular micro cloud).

The anomaly managing system 141 is described below in more detail with reference to FIGS. 2-9.

The vehicle 110 may be any type of vehicle. For example, the vehicle 110 may include one of the following types of vehicles: a car; a truck; a sports utility vehicle; a bus; a semi-truck; a drone; or any other roadway-based conveyance. The vehicle 110 may be a connected vehicle that includes a communication unit and is capable of communicating with other endpoints connected to the network 105.

In some embodiments, the vehicle 110 is a DSRC-enabled vehicle which includes a DSRC radio and a DSRC-compliant Global Positioning System (GPS) unit. The vehicle 110 may also include other V2X radios besides a DSRC radio. DSRC is not a requirement of embodiments described herein, and any form of V2X communications is also feasible.

The vehicle 110 may include one or more of the following elements: a processor 125B; a memory 127B; a communication unit 145B; a GPS unit 150; an onboard unit 152; a sensor set 154; and the anomaly managing client 199. These elements of the vehicle 110 may be communicatively coupled to one another via a bus.

The processor 125B, the memory 127B and the communication unit 145B may provide functionality similar to that of the processor 125A, the memory 127A and the communication unit 145A, respectively. Similar description will not be repeated here.

The memory 127B may store one or more of the following elements: the anomaly data 128; the strategy data 135; and sensor data 138. The anomaly data 128 and the strategy data 135 are described above, and similar description will not be repeated here.

The sensor data 138 may include digital data describing one or more sensor measurements of the sensor set 154. For example, the sensor data 138 may include vehicle data describing the vehicle 110 (e.g., GPS location data, speed data, heading data, etc.) and other sensor data describing a roadway environment (e.g., camera data depicting a roadway, etc.).

In some embodiments, the sensor data 138 is an example of the ego sensor data 195A depicted in FIG. 7.

The sensor set 154 includes one or more sensors that are operable to measure a roadway environment outside of the vehicle 110. For example, the sensor set 154 may include one or more sensors that record one or more physical characteristics of the roadway environment that is proximate to the vehicle 110. The memory 127B may store the sensor data 138 that describes the one or more physical characteristics recorded by the sensor set 154.

The sensor set 154 may also include various sensors that record an environment internal to a cabin of the vehicle 110. For example, the sensor set 154 includes onboard sensors which monitor the environment of the vehicle 110 whether internally or externally. In a further example, the sensor set 154 includes cameras, LIDAR, radars, infrared sensors, and sensors that observe the behavior of the driver such as internal cameras, biometric sensors, etc.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). The sensor set 154 may also include one or more of the following sensors: a water sensor; a wheel speed sensor; and any other type of automotive sensor.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. In some embodiments, the GPS unit 150 is a standard-compliant GPS unit of the vehicle 110. The standard-compliant GPS unit is operable to provide GPS data describing the geographic location of the vehicle 110 with lane-level accuracy.

The onboard unit 152 can include one or more processors and one or more memories. For example, the onboard unit 152 may be an electronic control Unit (ECU). The onboard unit 152 may control an operation of the sensor set 154 and the anomaly managing client 199 of the vehicle 110. In some embodiments, the anomaly managing client 199 is installed in the onboard unit 152.

The anomaly managing client 199 includes software that is operable to operate the vehicle 110 based on a control strategy. In some embodiments, the anomaly managing client 199 may be implemented using hardware including an FPGA or an ASIC. In some other embodiments, the anomaly managing client 199 may be implemented using a combination of hardware and software. The anomaly managing client 199 may be stored in a combination of the devices (e.g., servers or other devices), or in one of the devices.

A swarm function is now described according to some embodiments. In some embodiments, the swarm function is ordered by the anomaly managing system 141 and executed by the anomaly managing client 199 of a plurality of vehicles 110. A swarm function includes a route management instruction provided by the anomaly managing system 141 to the anomaly managing clients 199 of the plurality of vehicles 110 which instructs the vehicles 110 to navigate to navigate to a region at a similar time and drive in a formation which is operable to reduce or eliminate a risk caused by an anomaly.

The anomaly managing client 199 is described below in more detail according to some embodiments with reference to FIG. 5A.

Figure 2:
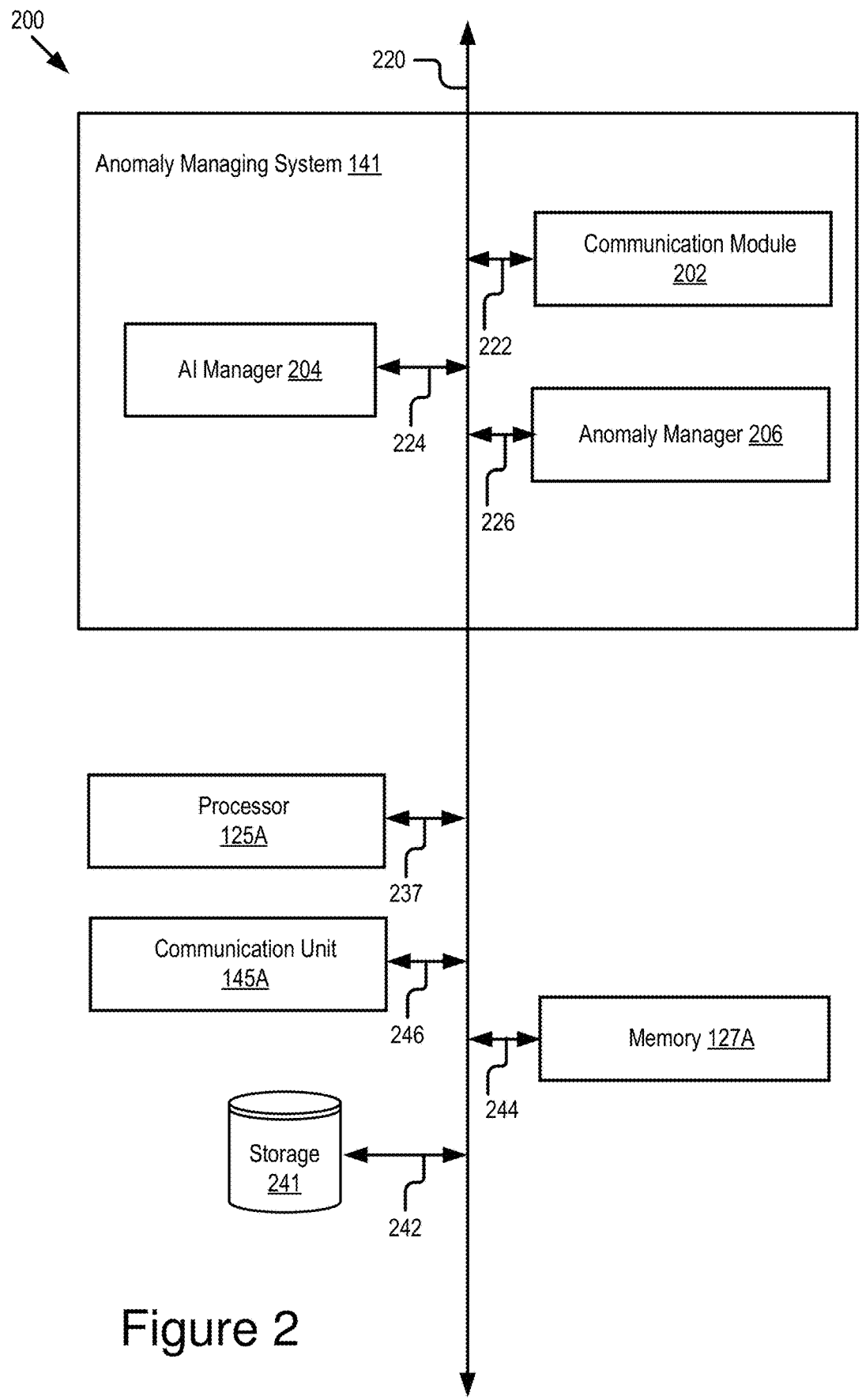
FIG. 2 is a block diagram illustrating an example computer system including the anomaly managing system according to some embodiments.

Referring now to FIG. 2, depicted is a block diagram illustrating an example computer system 200 including the anomaly managing system 141 according to some embodiments. In some embodiments, the computer system 200 may include a special-purpose computer system that is programmed to perform one or more steps of methods 300, 900, 1400 described below with reference to FIGS. 3,9, and 14, respectively. In some embodiments, the computer system 200 may include a special-purpose computer system that is programmed to perform one or more steps of any method described herein (e.g., the example general method).

In some embodiments, the computer system 200 may be an element of the server 140. In some other embodiments, the computer system 200 may be an element of a vehicle (e.g., a leader vehicle or a following vehicle in a vehicle platoon, a member vehicle in a vehicular micro cloud, etc.).

The computer system 200 may include one or more of the following elements according to some examples: the anomaly managing system 141; the processor 125A; and the communication unit 145A. The computer system 200 may further include one or more of the following elements: the memory 127A; and a storage 241. The components of the computer system 200 are communicatively coupled by a bus 220.

In the illustrated embodiment, the processor 125A is communicatively coupled to the bus 220 via a signal line 237. The communication unit 145A is communicatively coupled to the bus 220 via a signal line 246. The storage 241 is communicatively coupled to the bus 220 via a signal line 242. The memory 127A is communicatively coupled to the bus 220 via a signal line 244.

The following elements are described above with reference to FIG. 1: the processor 125A; the communication unit 145A; and the memory 127A. Similar description will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the anomaly managing system 141 includes: a communication module 202; an AI manager 204; and an anomaly manager 206. These components of the anomaly managing system 141 are communicatively coupled to each other via the bus 220. In some embodiments, components of the anomaly managing system 141 can be stored in a single server or device. In some other embodiments, components of the anomaly managing system 141 can be distributed and stored across multiple servers or devices.

The communication module 202 can be software including routines for handling communications between the anomaly managing system 141 and other components of the computer system 200. In some embodiments, the communication module 202 can be stored in the memory 127A of the computer system 200 and can be accessible and executable by the processor 125A. The communication module 202 may be adapted for cooperation and communication with the processor 125A and other components of the computer system 200 via a signal line 222.

The communication module 202 sends and receives data, via the communication unit 145A, to and from one or more elements of the operating environment 100. For example, the communication module 202 transmits, via the communication unit 145A, strategy data describing a control strategy to the vehicle 110 that is affected by an anomaly. The communication module 202 may send or receive any of the data or messages described herein via the communication unit 145A.

In some embodiments, the communication module 202 receives data from the other components of the anomaly managing system 141 and stores the data in one or more of the storage 241 and the memory 127A. The other components of the anomaly managing system 141 may cause the communication module 202 to communicate with the other elements of the computer system 200 or the operating environment 100 (via the communication unit 145A).

The AI manager 204 can be software including routines for determining hierarchical AI data associated with a roadway environment. In some embodiments, the AI manager 204 can be stored in the memory 127A of the computer system 200 and can be accessible and executable by the processor 125A. The AI manager 204 may be adapted for cooperation and communication with the processor 125A and other components of the computer system 200 via a signal line 224.

In some embodiments, the AI manager 204 receives sensor data from the vehicle 110 as well as other endpoints in the roadway environment (e.g., other vehicles, roadside units, etc.). The AI manager 204 aggregates the received sensor data. The AI manager 204 may determine current traffic information (e.g., real-time traffic information) based on the aggregated sensor data. The AI manager 204 may also determine predicted future traffic information based at least in part on the aggregated sensor data. Then, the AI manager 204 generates hierarchical AI data that describes one or more of the following: real-life traffic information; real-time traffic information; and predicted future traffic information. For example, the hierarchical AI data describes: (1) current locations, speeds, headings, etc., of various vehicles present in the roadway environment; and (2) predicted locations, speeds, headings, etc., of the various vehicles in a future time window.

In some embodiments, the AI manager 204 sends the hierarchical AI data to the anomaly manager 206.

The anomaly manager 206 can be software including routines for managing an anomaly and anomaly-affected entities. In some embodiments, the anomaly manager 206 can be stored in the memory 127A of the computer system 200 and can be accessible and executable by the processor 125A. The anomaly manager 206 may be adapted for cooperation and communication with the processor 125A and other components of the computer system 200 via a signal line 226.

In some embodiments, the anomaly manager 206 receives anomaly data describing an occurrence of an anomaly in a roadway environment. The anomaly data may include digital data describing one or more of the following: a type of the anomaly; a location of the anomaly; one or more parties that are involved in the anomaly directly; and a brief description of the anomaly, etc. For example, the brief description of the anomaly may include a series of actions involved in the anomaly.

The anomaly manager 206 determines an impact of the anomaly based at least in part on the anomaly data. The impact of the anomaly may describe a risk of the anomaly in the roadway environment. In some embodiments, the anomaly manager 206 determines an impact of the anomaly based on one or more of: the type of the anomaly; and a location of the anomaly.

For example, if the anomaly describes that a pedestrian suddenly screams on a sidewalk in a residential area, the anomaly manager 206 may determine that the impact of the anomaly in the roadway environment is relatively small. However, if the anomaly describes a car crash on a highway, the anomaly manager 206 may determine that the impact of the anomaly is significant.

The anomaly manager 206 determines an influence region of the anomaly based on one or more of: the impact of the anomaly; and one or more roadway condition parameters. The one or more roadway condition parameters include one or more of: a traffic condition parameter and a road geometry parameter. The traffic condition parameter may describe a traffic condition in the roadway environment (e.g., a traffic congestion on a roadway, rush-hour traffic, or sparse traffic on a roadway, etc.). The traffic condition parameter can be a dynamic parameter. The road geometry parameter may describe a condition of a roadway in the roadway environment (e.g., a road in a mountainous area, a road with sharp turns, a road with a single lane in each direction, a road with multiple lanes in each direction, etc.). The road geometry parameter can be a static parameter.

For example, assume that the anomaly describes that a lane on a highway is closed during a time period of 12:00 AM-5:00 AM for maintenance and the highway has multiple lanes in each direction. The anomaly manager 206 determines an influence region of the anomaly as a relatively small area in the roadway environment (e.g., an area with a maximum distance to the anomaly being no greater than 100 meters) due to sparse traffic on the highway during this time period.

In another example, assume that the anomaly describes that a car crash occurs during rush hours on a highway. The anomaly manager 206 determines an influence region of the anomaly as a relatively large area in the roadway environment (e.g., an area of the highway that is around the location of anomaly and that covers at least a distance of multiple exits of the highway). This is because the impact of the anomaly is relatively large and there is heavy traffic on the highway during the rush hours.

The anomaly manager 206 determines a set of anomaly severity indices associated with a set of sub-regions within the influence region. Specifically, the anomaly manager 206 determines the set of anomaly severity indices based on one or more roadway condition parameters. The anomaly manager 206 divides the influence region into the set of sub-regions so that each sub-region is associated with a corresponding anomaly severity index from the set of anomaly severity indices.

For example, if the anomaly occurs on a highway with heavy traffic, the anomaly manager 206 may generate a first anomaly severity index, a second anomaly severity index and a third anomaly severity index for the influence region. The anomaly manager 206 divides the influence region into three sub-regions. The anomaly manager 206 associates a first sub-region that is immediately around (e.g., just behind or ahead of) the anomaly with the first anomaly severity index having an urgent impact-severity level. The anomaly manager 206 associates a second sub-region that is following the first sub-region with the second anomaly severity index having an intermediate impact-severity level. The anomaly manager 206 associates a third sub-region that is following the second sub-region with the third anomaly severity index having a moderate impact-severity level.

In another example, if the anomaly occurs in a country road with sparse traffic, the anomaly manager 206 may generate an anomaly severity index with a moderate impact-severity level. The anomaly manager 206 associates the entire influence region with the anomaly severity index having the moderate impact-severity level.

The anomaly manager 206 identifies a group of anomaly-affected entities within the influence region based on the hierarchical AI data. In some examples, the group of anomaly-affected entities includes a group of vehicles present within the influence region. The anomaly manager 206 manages the group of anomaly-affected entities within the influence region based on the set of anomaly severity indices.

Specifically, for each sub-region from the set of sub-regions, the anomaly manager 206 identifies one or more anomaly-affected entities within the sub-region. For example, the anomaly manager 206 receives the hierarchical AI data that describes one or more of real-time traffic information and predicted future traffic information in the roadway environment. The anomaly manager 206 identifies the one or more anomaly-affected entities within the sub-region based on the hierarchical AI data. In a further example, the hierarchical AI data describes: (1) current locations, speeds, headings, etc., of various vehicles present in the roadway environment; and (2) predicted locations, speeds, headings, etc., of the various vehicles in future time. Then, the anomaly manager 206 identifies one or more vehicles that are present within the sub-region based on the hierarchical AI data. The one or more vehicles are affected by the anomaly.

In some examples, the anomaly manager 206 dynamically computes a similarity score for each entity that is around the anomaly. The anomaly manager 206 identifies anomaly-affected entities within each sub-region based on similarity scores of the entities. For example, a similarity score of a particular entity can be computed as a distance between the entity and the anomaly. If the similarity score of the entity is no greater than a first threshold, the anomaly manager 206 determines that the entity is within the first sub-region of the influence region. If the similarity score of the entity is greater than the first threshold and no greater than a second threshold, the anomaly manager 206 determines that the entity is within the second sub-region of the influence region. If the similarity score of the entity is greater than the second threshold and no greater than a third threshold, the anomaly manager 206 determines that the entity is within the third sub-region of the influence region. Values for the first threshold, the second threshold and the third threshold can be determined based on a type of the anomaly and one or more roadway condition parameters or can be configured by a user.

For each sub-region from the set of sub-regions, the anomaly manager 206 generates a control strategy to manage the one or more anomaly-affected entities in the sub-region based on a corresponding anomaly severity index associated with the sub-region. In some embodiments, the control strategy includes one or more of the following: instructing the one or more anomaly-affected entities to change their lanes; and controlling the one or more anomaly-affected entities to change their speeds. The control strategy may further include one or more of the following: rerouting the one or more anomaly-affected entities; and detouring the one or more anomaly-affected entities.

For example, the anomaly manager 206 generates a first control strategy for first anomaly-affected entities present within a first sub-region. The first sub-region is immediately around the anomaly and associated with a first anomaly severity index having an urgent impact-severity level. The first control strategy instructs the first anomaly-affected entities in the first sub-region to change their lanes immediately. The anomaly manager 206 generates a second control strategy for second anomaly-affected entities present within a second sub-region. The second sub-region is following the first sub-region and associated with a second anomaly severity index having an intermediate impact-severity level. The second control strategy provides speed advisory to the second anomaly-affected entities in the second sub-region (e.g., advising the second anomaly-affected entities to change their speeds). The anomaly manager 206 generates a third control strategy for third anomaly-affected entities present within a third sub-region. The third sub-region is following the second sub-region and associated with a third anomaly severity index having a moderate impact-severity level. The third control strategy may reroute the third anomaly-affected entities.

For each sub-region from the set of sub-regions, the anomaly manager 206 instructs the one or more anomaly-affected entities in the sub-region to execute the corresponding control strategy. For example, the anomaly manager 206 may send strategy data describing the corresponding control strategy to the one or more anomaly-affected entities via a V2X communication. A receipt of the strategy data at the one or more anomaly-affected entities may cause the one or more anomaly-affected entities to carry out the corresponding control strategy. For example, a receipt of the strategy data at the vehicle 110 can modify an operation of an Advanced Driver Assistance System (ADAS system) of the vehicle 110 so that the ADAS system operates the vehicle 110 based on the control strategy.

Referring now to FIG. 3, depicted is a flowchart of an example method 300 for managing an anomaly and a group of anomaly-affected entities according to some embodiments. The steps of the method 300 are executable in any order, and not necessarily the order depicted in FIG. 3.

At step 303, the anomaly manager 206 receives anomaly data describing an occurrence of an anomaly in a roadway environment.

At step 305, the anomaly manager 206 determines an influence region of the anomaly in the roadway environment.

At step 307, the anomaly manager 206 determines a set of anomaly severity indices associated with a set of sub-regions within the influence region.

At step 309, the anomaly manager 206 manages a group of anomaly-affected entities within the influence region based on the set of anomaly severity indices.

Figure 4:
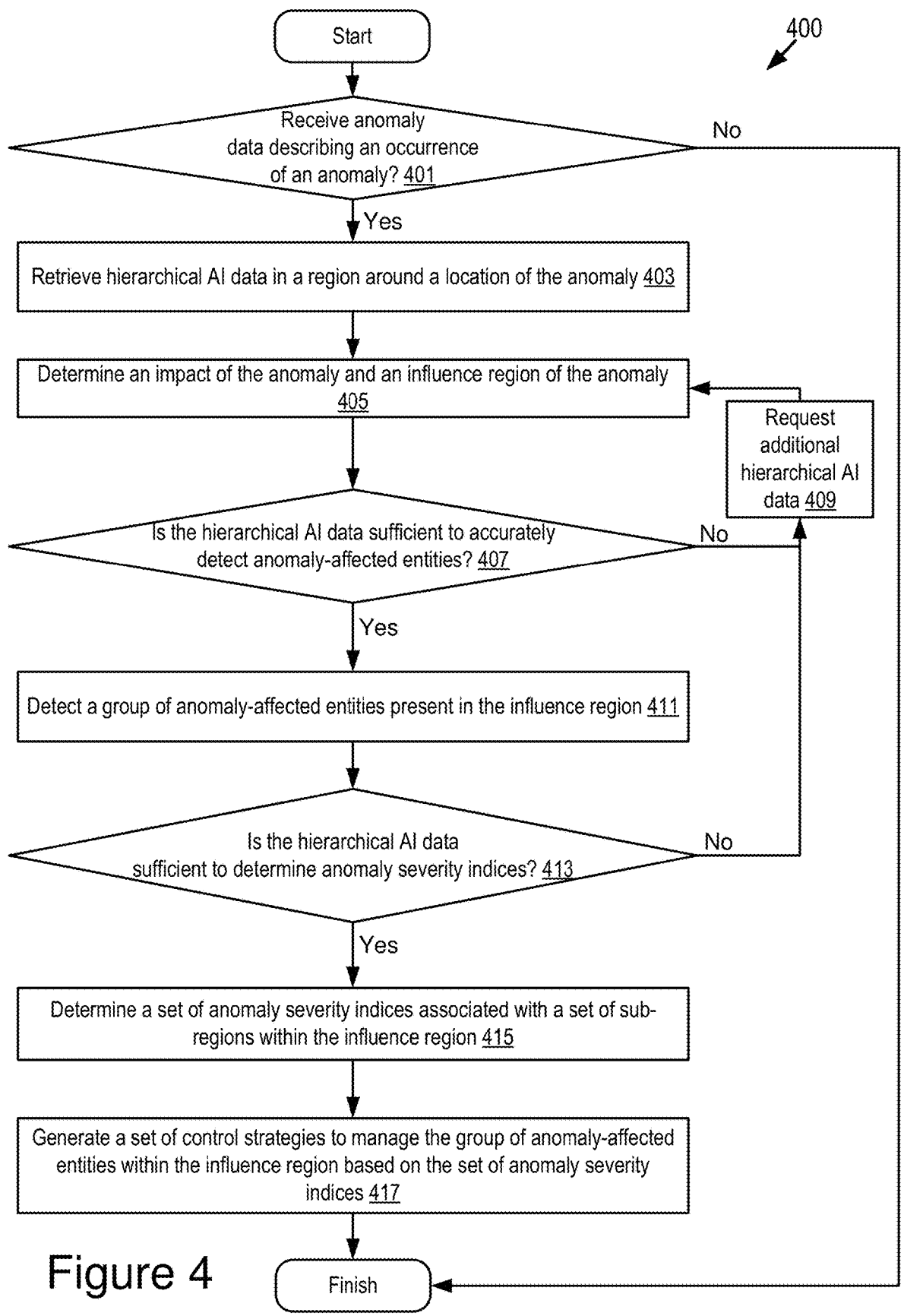
FIG. 4 depicts another method for managing an anomaly and a group of entities affected by the anomaly according to some embodiments.

FIG. 4 depicts another method 400 for managing an anomaly and a group of anomaly-affected entities according to some embodiments. The steps of the method 400 are executable in any order, and not necessarily the order depicted in FIG. 4.

At step 401, the anomaly manager 206 determines whether anomaly data describing an occurrence of an anomaly is received. Responsive to receiving the anomaly data, the method 400 moves to step 403. Otherwise, the method 400 ends.

At step 403, the anomaly manager 206 retrieves hierarchical AI data in a region around a location of the anomaly.

At step 405, the anomaly manager 206 determines an impact of the anomaly and an influence region of the anomaly.

At step 407, the anomaly manager 206 determines whether the hierarchical AI data is sufficient to accurately detect anomaly-affected entities in the influence region. Responsive to the hierarchical AI data being sufficient to accurately detect anomaly-affected entities, the method 400 moves to step 411. Otherwise, the method 400 moves to step 409.

At step 409, the anomaly manager 206 requests additional hierarchical AI data from the AI manager 204. Then, the method 400 moves back to step 405.

At step 411, the anomaly manager 206 detects a group of anomaly-affected entities present in the influence region.

At step 413, the anomaly manager 206 determines whether the hierarchical AI data is sufficient to determine anomaly severity indices. Responsive to the hierarchical AI data being sufficient to determine anomaly severity indices, the method 400 moves to step 415. Otherwise, the method 400 moves to step 409.

At step 415, the anomaly manager 206 determines a set of anomaly severity indices associated with a set of sub-regions within the influence region.

At step 417, the anomaly manager 206 generates a set of control strategies to manage the group of anomaly-affected entities within the influence region based on the set of anomaly severity indices.

Figure 5A:
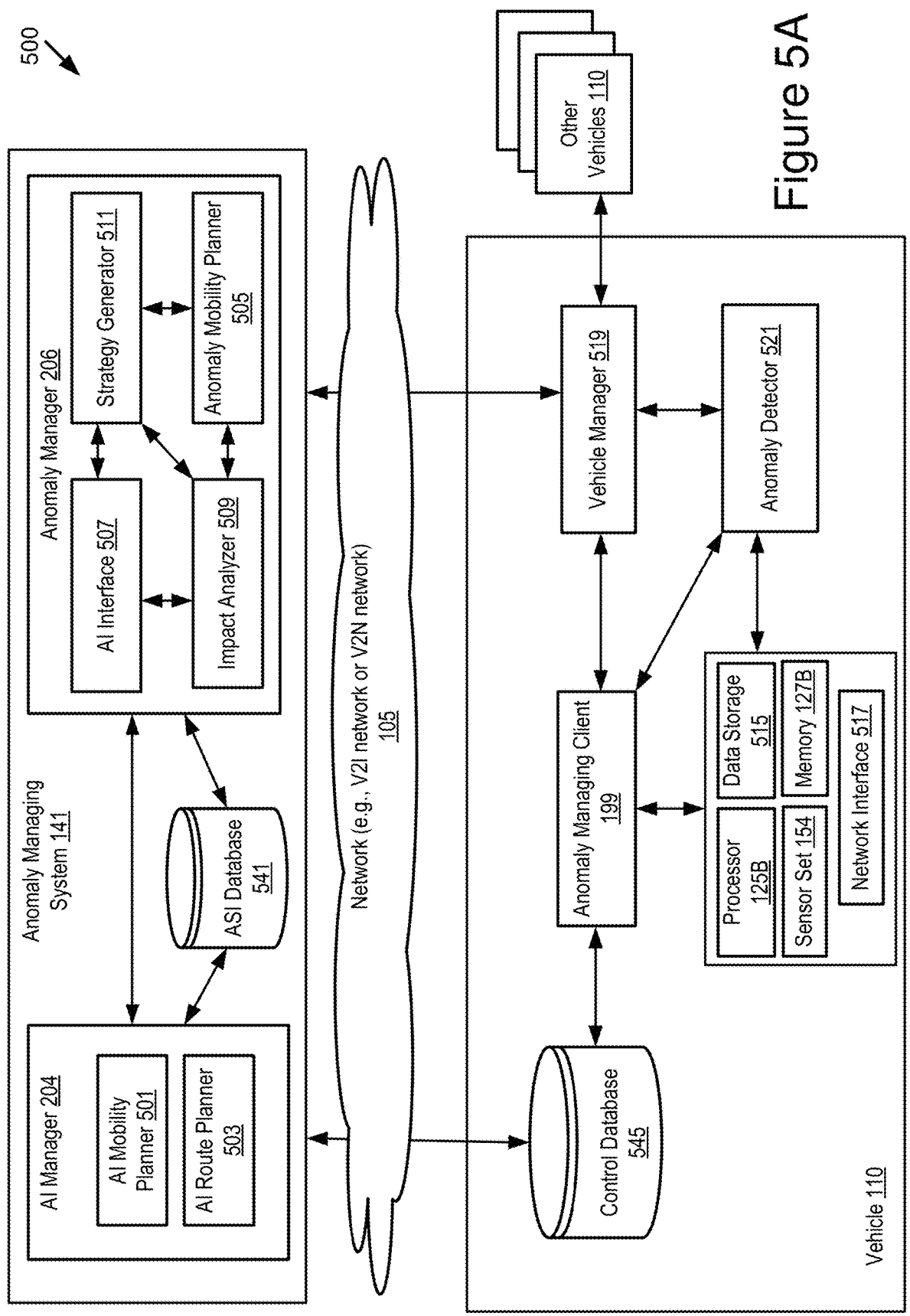
FIG. 5A is a block diagram illustrating an architecture for the anomaly managing system and the anomaly managing client according to some embodiments.

Referring to FIG. 5A, an example architecture 500 for the anomaly managing system 141 and the anomaly managing client 199 is illustrated. The anomaly managing system 141 may be installed in the server 140. The vehicle 110 may detect an occurrence of an anomaly. The vehicle 110 may be affected by the anomaly.

Besides the elements described above with reference to FIG. 1, the vehicle 110 may also include a data storage 515, a network interface 517, a control database 545, a vehicle manager 519 and an anomaly detector 521.

The anomaly detector 521 may include code and routines for detecting an occurrence of an anomaly in the roadway environment. For example, the anomaly detector 521 may detect the occurrence of the anomaly by performing operations described in U.S. application Ser. No. 16/273,134, filed on Feb. 11, 2019, titled "Anomaly Mapping by Vehicular Micro Clouds," the entirety of which is incorporated herein by reference.

The vehicle manager 519 may include code and routines for performing coordination with other vehicles 110 via V2X communications. For example, the vehicle manager 519 may manage (e.g., establish and maintain) inter-vehicular wireless links and control executions of collaborative operations among the vehicles 110.

The anomaly managing client 199 of the vehicle 110 may cause the vehicle manager 519 to send sensor data recorded by the vehicle 110 to the anomaly managing system 141. The sensor data can be recorded by the sensor set 154 and forwarded to the anomaly managing client 199 and the anomaly detector 521 from the sensor set 154.

The anomaly managing client 199 may also receive anomaly data describing the anomaly from the anomaly detector 521. The anomaly managing client 199 may send, via the vehicle manager 519, the anomaly data to the anomaly managing system 141.

Turning to the AI manager 204, in some embodiments the AI manager 204 may include one or more of the following elements: an AI mobility planner 501; and an AI route planner 503.

The AI mobility planner 501 is operable to continuously monitor mobility information of connected entities (e.g., vehicles) and store current route information and predicted route information of the connected entities. The AI mobility planner 501 may generate the hierarchical AI data based at least on the current route information and predicted route information of the connected entities and any other information of the connected entities (e.g., speed data, heading data, etc.).

The AI route planner 503 may be operable to plan routes for the connected entities based on the hierarchical AI data. In some embodiments, the AI route planner 503 may assist the anomaly manager 206 to plan routes for the anomaly-affected entities responsive to the occurrence of the anomaly.

Turning to the anomaly manager 206, in some embodiments the anomaly manager 206 may include one or more of the following elements: an anomaly mobility planner 505; an AI interface 507; an impact analyzer 509; and a strategy generator 511.

The anomaly mobility planner 505 may be operable to monitor information of anomalies present in the roadway environment. This information may include, but is not limited to, one or more of the following: location information; description information; and any other information related to the anomaly.

The AI interface 507 may be operable to retrieve hierarchical AI data associated with the roadway environment from the AI manager 204.

The impact analyzer 509 may be operable to determine an impact of the anomaly. The impact analyzer 509 may also determine an influence region of the anomaly based on one or more roadway condition parameters and the impact of the anomaly. The impact analyzer 509 determines a set of anomaly severity indices associated with a set of sub-regions within the influence region.

In some embodiments, the anomaly data and the set of anomaly severity indices are stored in an ASI database 541.

The strategy generator 511 may be operable to manage anomaly-affected entities within the influence region based on the set of anomaly severity indices. For example, for each sub-region from the set of sub-regions, the strategy generator 511 identifies, one or more anomaly-affected entities within the sub-region. The strategy generator 511 generates a corresponding control strategy to manage the one or more anomaly-affected entities in the sub-region based on a corresponding anomaly severity index associated with the sub-region. The strategy generator 511 instructs the one or more anomaly-affected entities in the sub-region to execute the corresponding control strategy. As a result, the strategy generator 511 generates a set of control strategy to manage anomaly-affected entities in the influence region based on the set of anomaly severity indices.

For example, with respect to the vehicle 110 which is affected by the anomaly, the strategy generator 511 identifies that the vehicle 110 is present within a particular sub-region that is associated with a particular anomaly severity index. The strategy generator 511 generates a control strategy for the vehicle 110 based on the particular anomaly severity index. The strategy generator 511 sends strategy data describing the control strategy to the vehicle 110.

After receiving the strategy data, the anomaly managing client 199 of the vehicle 110 may store the strategy data in a control database 545. The anomaly managing client 199 may inform the vehicle manager 519 about the received strategy data. The anomaly managing client 199 ensures that the vehicle manager 519 follows the control strategy described by the strategy data so that the vehicle 110 operates in accordance with the control strategy to mitigate an effect of the anomaly. For example, assume that the control strategy instructs the vehicle 110 to change a lane immediately. Then, the vehicle manager 519 can modify an operation of an ADAS system of the vehicle 110 so that the ADAS system controls the vehicle 110 to change its lane immediately.

Figure 5B:
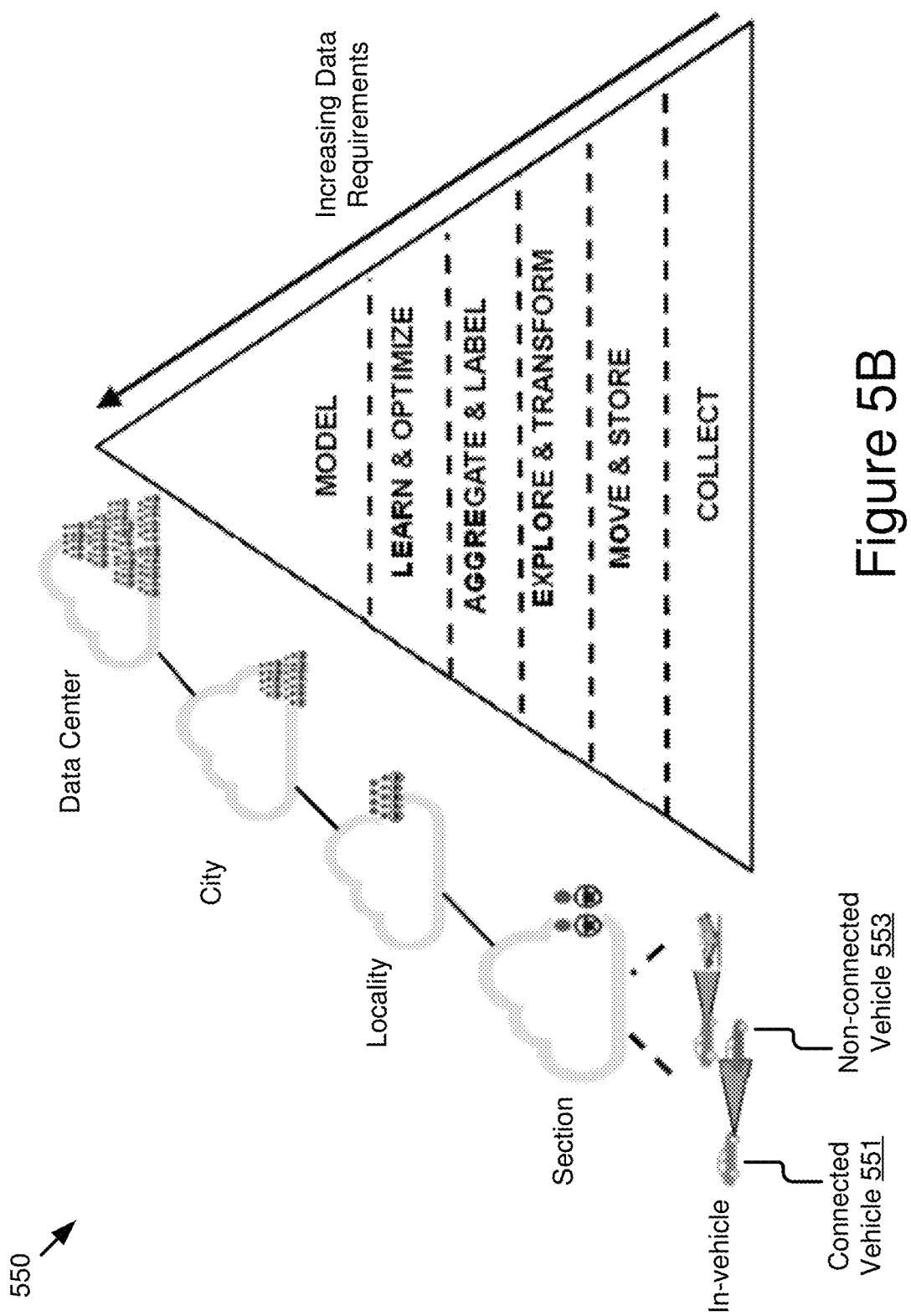
FIG. 5B is a graphical representation illustrating an example approach for learning hierarchical AI data according to some embodiments.

FIG. 5B is a graphical representation illustrating an example approach 550 for learning hierarchical AI data according to some embodiments. In the example approach 550, the hierarchical AI data is learned hierarchically from large scale and fragmented vehicle data (e.g., sensor data from vehicles) in real time. The vehicles can include connected vehicles 551 and non-connected vehicles 553.

Various types of vehicle data are collected including, but not limited to, instrumentation data, logging data, sensor data or any other type of data. Reliable streams of data can be stored in data storages (either structured or unstructured data storages) so that a reliable data flow is established.

The data collected through the reliable data flow is explored and transformed via, e.g., data cleaning and data preparation, etc. Any missing data in the data flow can be identified.

Business intelligence can be used to define metrics to track and evaluate the data. For example, various analytics methods and different metrics can be used to evaluate the data. The data can be aggregated and labeled. Features of the data can be extracted and used as training data. After a series of operations are performed on the data, the data can be modeled using one or more data models.

Figure 6:
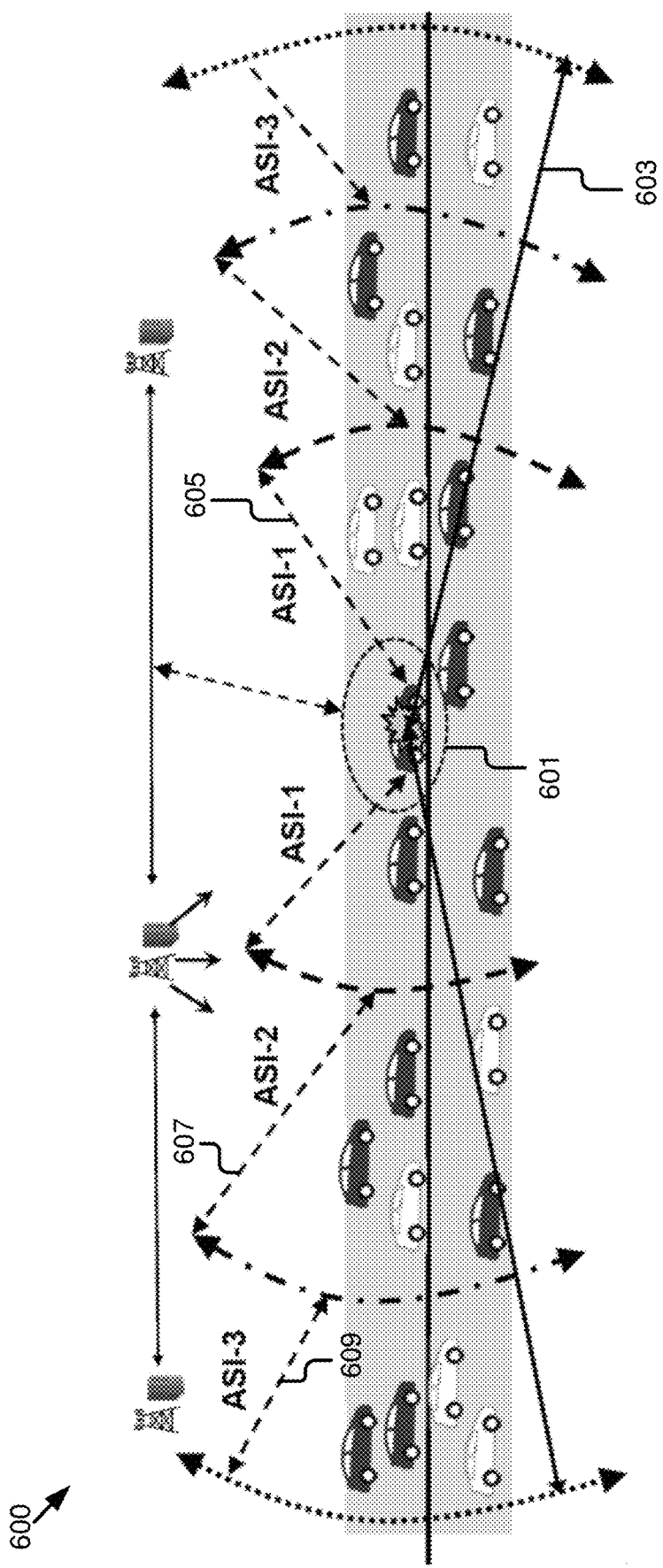
FIG. 6 is a graphical representation illustrating an example of managing an anomaly and a group of entities affected by the anomaly according to some embodiments.

FIG. 6 is a graphical representation illustrating an example 600 of managing an anomaly and a group of anomaly-affected entities according to some embodiments. Initially, an occurrence of an anomaly is detected at a location 601 in a roadway environment. Responsive to receiving anomaly data describing the anomaly, the anomaly managing system 141 determines an influence region of the anomaly. For example, the influence region includes a range centered at the location 601 of the anomaly with a maximum distance 603 to the location 601.

The anomaly managing system 141 determines a first anomaly severity index ASI-1, a second anomaly severity index ASI-2 and a third anomaly severity index ASI-3 for the influence region. The anomaly managing system 141 divides the influence region into three sub-regions. A first sub-region includes an area in the roadway environment that covers the location 601 of the anomaly and has a maximum distance 605 to the location 601. The first sub-region is associated with the first anomaly severity index ASI-1. A second sub-region includes an area that is following the first sub-region with a maximum distance 607 to a boundary of the first sub-region. The second sub-region is associated with the second anomaly severity index ASI-2. A third sub-region includes an area that is following the second sub-region with a maximum distance 609 to a boundary of the second sub-region. The third sub-region is associated with the third anomaly severity index ASI-3.

The anomaly managing system 141 identifies corresponding vehicles in the first, second and third sub-regions, respectively. The anomaly managing system 141 generates a first control strategy to manage vehicles in the first sub-region, a second control strategy to manage vehicles in the second sub-region and a third control strategy to manage vehicles in the third sub-region, respectively.

Referring now to FIG. 7, depicted is a block diagram illustrating an operating environment 700 for an anomaly managing client 199 and an anomaly managing system 141 according to some embodiments. The operating environment 700 is present in a roadway environment 142. In some embodiments, each of the elements of the operating environment 700 is present in the same roadway environment 142 at the same time. In some embodiments, some of the elements of the operating environment 700 are not present in the same roadway environment 142 at the same time.

The operating environment 700 may include one or more of the following elements: an ego vehicle 123 (referred to herein as a "vehicle 123" or an "ego vehicle 123"); an Nth remote vehicle 124 (where "N" refers to any positive whole number greater than one); a roadway device 151; and a cloud server 103. These elements are communicatively coupled to one another via a network 105. These elements of the operating environment 700 are depicted by way of illustration. In practice, the operating environment 700 may include one or more of the elements depicted in FIG. 7. The Nth remote vehicle 124 may be referred to as a remote vehicle 124.

The operating environment 700 also includes the roadway environment 142. The roadway environment 142 was described above, and that description will not be repeated here.

In some embodiments, one or more of the ego vehicle 123, the remote vehicle 124, and the network 105 are elements of a vehicular micro cloud 194. As depicted, the roadway device 151 includes an edge server 104. According to some embodiments, the edge server 104 is an optional feature of the operating environment 100.

In some embodiments, the ego vehicle 123, the remote vehicle 124, the edge server 104, and the cloud server 103 include similar elements. For example, each of these elements of the operating environment 100 include their own processor 125B (processor 125A for the edge server 104 and the cloud server 103), bus 121, memory 127B (memory 127A for the edge server 104 and the cloud server 103), communication unit 145B, sensor set 154, onboard unit 152

(not included in the edge server 104 or the cloud server 103), standard-compliant GPS unit 107 (not included in the edge server 104 or the cloud server 103), and anomaly managing client 199 (the edge server 104 and the cloud server include an anomaly managing system 141 instead of an anomaly managing client 199). These elements of the ego vehicle 123, the remote vehicle 124, the edge server 104, and the cloud server 103 provide the same or similar functionality regardless of whether they are included in the ego vehicle 123, the remote vehicle 124, the edge server 104, and the cloud server 103. Accordingly, the descriptions of these elements will not be repeated in this description for each of the ego vehicle 123, the remote vehicle 124, the edge server 104, and the cloud server 103.

In the depicted embodiment, the ego vehicle 123, the remote vehicle 124, the edge server 104, and the cloud server 103 store similar digital data. For example, the system data 161 includes some or all of the digital data depicted in FIG. 7 as being stored by the memory 127B of the ego vehicle 123. In some embodiments, some or all of the ego vehicle 123, the remote vehicle 124, the edge server 104, and the cloud server 103 store a version of the system data 161, which may or may not be similar in terms of content relative to one another.

In some embodiments, the system data 161 includes a data structure that organizes instances of behavior data 192. For example, the anomaly managing client 199 transmits V2X messages to the edge server 104 that include the instances of behavior data 192 that it generates. In this way, the anomaly managing client 199 reports the behavior data 192 to the anomaly managing system 141 which is an element of an edge server 104. The anomaly managing system 141 builds and maintains a data structure of behavior data 192. Vehicles (e.g., remote vehicles 124, the ego vehicle 123) on the roadway request from the edge server 104 behavior data 192 for particular geographic regions or segments of a roadway which they are traveling in or will being traveling in the future. The data structure managed by the anomaly managing system 141 organizes the behavior data 192 so that it is retrievable by the anomaly managing system 141 using queries that specify geographic regions or roadway segments, which are themselves specified by the requests received from the vehicles. The anomaly managing system 141 provides V2X messages to these requesting vehicles that includes the behavior data 192 that is responsive to their requests. In this way, the anomaly managing system 141 provides a behavior data services to the connected vehicles of a roadway environment 142 in some embodiments.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference.

In some embodiments, the vehicular micro cloud 194 is a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores membership data. The membership data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the membership data describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the edge server 104 is the hub of the vehicular micro cloud 194.

The network 105 was described above with reference to FIG. 1, and so, that description will not be repeated here.

The network 105 is an element of the vehicular micro cloud 194. Accordingly, the vehicular micro cloud 194 is not the same thing as the network 105 since the network is merely a component of the vehicular micro cloud 194. For example, the network 105 does not include membership data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 107 that is an element of the sensor set 154 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 is similar to the vehicle 110A depicted in FIG. 1. The remote vehicle 124 is similar to the Nth vehicle 110N depicted in FIG. 1. The edge server 104 and/or the cloud server 103 are similar to the server 140 depicted in FIG. 1.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 7, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125B; a sensor set 154; a standard-compliant GPS unit 107; a vehicle control system 153 (see, e.g., FIG. 8); a communication unit 145B; an onboard unit 152; a memory 127B; and an anomaly managing client 199. These elements may be communicatively coupled to one another via a bus 121. In some embodiments, the communication unit 145B includes a V2X radio. In some embodiments, the communication unit 145B includes a C-V2X radio.

The processor 125B depicted in FIG. 7 as an element of the ego vehicle 123 includes similar functionality as the processor 125B depicted in FIG. 1 as an element of the vehicle 110, and so, those descriptions will not be repeated here.

In some embodiments, the processor 125B may be an element of a processor-based computing device of the ego vehicle 123. For example, the ego vehicle 123 may include one or more of the following processor-based computing devices and the processor 125B may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125B is an element of the onboard unit 152.

The onboard unit 152 is a special purpose processor-based computing device. In some embodiments, the onboard unit 152 is a communication device that includes one or more of the following elements: the communication unit 145B; the processor 125B; the memory 127B; and the anomaly managing client 199. In some embodiments, the onboard unit 152 is the computer system 200 depicted in FIG. 2. In some embodiments, the onboard unit 152 is an electronic control unit (ECU).

The sensor set 154 includes one or more onboard sensors. The sensor set 154 may record sensor measurements that describe the ego vehicle 123 or the physical environment that includes the ego vehicle 123. The sensor data includes digital data that describes the sensor measurements.

In some embodiments, the sensor set 154 may include one or more sensors that are operable to measure the physical environment outside of the ego vehicle 123. For example, the sensor set 154 may include cameras, lidar, radar, sonar and other sensors that record one or more physical characteristics of the physical environment that is proximate to the ego vehicle 123.

In some embodiments, the sensor set 154 may include one or more sensors that are operable to measure the physical environment inside a cabin of the ego vehicle 123. For example, the sensor set 154 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 154 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 107); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a TSS; a variable reluctance sensor; a VSS; a water sensor; a wheel speed sensor; and any other type of automotive sensor.

The sensor set 154 is operable to record the ego sensor data 195A (or the remote sensor data 195B if the sensor set 154 is an element of the remote vehicle 124). The ego sensor data 195A (or the remote sensor data 195B if the sensor set 154 is an element of the remote vehicle 124) includes digital data that describes images or other measurements of the physical environment such as the conditions, objects, and other vehicles present in the roadway environment 142. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 154.

The physical environment may include a roadway region, parking lot, or parking garage that is proximate to the ego vehicle 123. The sensor data may describe measurable aspects of the physical environment. In some embodiments, the physical environment is the roadway environment 142. As such, in some embodiments, the roadway environment 142 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 154 or whose presence is determinable from the digital data stored on the memory 127B. An item is "proximate to the ego vehicle 123" if it is directly measurable by a sensor of the ego vehicle 123 or its presence is inferable and/or determinable by the anomaly managing client 199 based on analysis of the sensor data which is recorded by the ego vehicle 123 and/or one or more of the vehicular micro cloud 194.

In some embodiments, the ego sensor data 195A includes, among other things, one or more of the following: lidar data (i.e., depth information) recorded by an ego vehicle 123; or camera data (i.e., image information) recorded by the ego vehicle 123. The lidar data includes digital data that describes depth information about a roadway environment 142 recorded by a lidar sensor of a sensor set 154 included in the ego vehicle 123. The camera data includes digital data that describes the images recorded by a camera of the sensor set 154 included in the ego vehicle 123.

In some embodiments, the sensors of the sensor set 154 are operable to collect the ego sensor data 195A (or the remote sensor data 195B if the sensor set 154 is an element of the remote vehicle 124). The sensors of the sensor set 154 include any sensors that are necessary to measure and record the measurements described by the ego sensor data 195A (or the remote sensor data 195B if the sensor set 154 is an element of the remote vehicle 124). In some embodiments, the ego sensor data 195A (or the remote sensor data 195B if the sensor set 154 is an element of the remote vehicle 124) includes any sensor measurements that are necessary to generate the other digital data stored by the memory 127. In some embodiments, the ego sensor data 195A (or the remote sensor data 195B if the sensor set 154 is an element of the remote vehicle 124) includes digital data that describes any sensor measurements that are necessary for the anomaly managing client 199 to provide its functionality as described herein with reference any of the methods described herein.

In some embodiments, the sensor set 154 includes any sensors that are necessary to record ego sensor data 195A (or the remote sensor data 195B if the sensor set 154 is an element of the remote vehicle 124) that describes the roadway environment 142 in sufficient detail to create a digital twin of the roadway environment 142. In some embodiments, the anomaly managing client 199 generates the set of nano clouds and assigns sub-tasks to the nano clouds based on the outcomes observed by the anomaly managing client 199 during the execution of a set of digital twins that simulate the real-life circumstances of the ego vehicle 123.

For example, in some embodiments the anomaly managing client 199 includes simulation software. The simulation software is any simulation software that is capable of simulating an execution of a vehicular micro cloud task by the vehicular micro cloud 194. For example, the simulation software is a simulation software that is capable of conducting a digital twin simulation. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 142 of the real-world vehicle. The simulation software includes code and routines that are operable to execute simulations based on digital twins of real-world vehicles in the roadway environment.

In some embodiments, the simulation software is integrated with the anomaly managing client 199. In some other embodiments, the simulation software is a standalone software that the anomaly managing client 199 can access to execute digital twin simulations to determine the best way to divide the vehicular micro cloud 194 into nano clouds and which sub-tasks to assign which nano clouds. The digital twin simulations may also be used by the anomaly managing client 199 to determine how to break down the vehicular micro cloud task into sub-tasks.

The ego sensor data 195A (or the remote sensor data 195B if the sensor set 154 is an element of the remote vehicle 124) includes digital data that describes any measurement that is taken by one or more of the sensors of the sensor set 154.

The standard-compliant GPS unit 107 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 107 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 107 is compliant with one or more standards governing V2X communications but does not provide GPS measurements that are lane-level accurate.

In some embodiments, the standard-compliant GPS unit 107 includes any hardware and software necessary to make the ego vehicle 123 or the standard-compliant GPS unit 107 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 107 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the standard-compliant GPS unit 107.

An example process for generating GPS data describing a geographic location of an object (e.g., a queue, the ego vehicle 123, the remote vehicle 124, or some other object located in a roadway environment) is now described according to some embodiments. In some embodiments, the anomaly managing client 199 include code and routines that are operable, when executed by the processor 125B, to cause the processor 125B to: analyze (1) GPS data describing the geographic location of the ego vehicle 123 and (2) ego sensor data 195A describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 107 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 107 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the anomaly managing client 199 described herein may analyze the GPS data provided by the standard-compliant GPS unit 107 and determine what lane the ego vehicle 123 is traveling in based on the relative positions of two or more different vehicles (one of which is, for example, the ego vehicle 123) traveling on a roadway at the same time.

By comparison to the standard-compliant GPS unit 107, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the anomaly managing client 199 to determine the lane of travel of the ego vehicle 123. This measurement improves the accuracy of the GPS data describing the location of lanes used by the ego vehicle 123 when the anomaly managing client 199 is providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the sensor data 195. For example, the standard-compliant GPS unit 107 is a sensor included in the sensor set 154 and the GPS data is an example type of sensor data 195.

The communication unit 145B transmits and receives data to and from a network 105 or to another communication channel. In some embodiments, the communication unit 145B may include a DSRC transmitter, a DSRC receiver and other hardware or software necessary to make the ego vehicle 123 a DSRC-equipped device. In some embodiments, the anomaly managing client 199 is operable to control all or some of the operation of the communication unit 145.

In some embodiments, the communication unit 145B includes a port for direct physical connection to the network 105 or to another communication channel. For example, the communication unit 145B includes a USB, SD, CAT-5, or similar port for wired communication with the network 105. In some embodiments, the communication unit 145B includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145B includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145B includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145B includes a wired port and a wireless transceiver. The communication unit 145B also provides other conventional connections to the network 105 for distribution of files or media objects using standard network protocols including TCP/IP, HTTP, HTTPS, and SMTP, millimeter wave, DSRC, etc.

In some embodiments, the communication unit 145B includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described herein are transmitted by the C-V2X radio on the upper 30 MHz of the 5.9 GHz band (i.e., 5.895-5.925 GHz) as directed by the anomaly managing client 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 107 is an element of the V2X radio.

In some embodiments, the memory 127B may store any or all of the digital data or information described herein. The memory 127B is similar to the memory 127B described above with reference to FIG. 1

As depicted in FIG. 7, the memory 127B stores the following digital data: the membership data; the ego sensor data 195A; the remote sensor data 195B; the vehicle data 191; the behavior data 192; the anomaly data 193; the threshold data 196; and the management plan data 197.

In some embodiments, the V2X messages (or C-V2X messages) described herein are also stored in the memory 127. In some embodiments, one or more of the remote sensor data 195B and the vehicle data 191 are received from the remote vehicles via BSMs or some other V2X transmission.

These elements were described above with reference to the example general method, and so, those descriptions will not be repeated here: the ego sensor data 195A; the remote sensor data 195B; the vehicle data 191; the behavior data 192; the anomaly data 193; the threshold data 196; and the management plan data 197.

In some embodiments, the ego vehicle 123 includes a vehicle control system. A vehicle control system includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the ADAS system or the autonomous driving system are operable to implement the management plan data 197. In some embodiments, the anomaly managing client 199 provides the management plan data 197 to these onboard systems of the ego vehicle 123 and, in so doing, modifies the operation of these onboard systems so that they execute driving maneuvers consistent with the driving management plan.

In some embodiments, the anomaly managing client 199 includes code and routines that are operable, when executed by the processor 125B, to execute one or more steps of the method 300 described below with reference to FIG. 3. In some embodiments, the anomaly managing client 199 includes code and routines that are operable, when executed by the processor 125B, to execute one or more steps of the method 900 described below with reference to FIG. 9. In some embodiments, the anomaly managing client 199 includes code and routines that are operable, when executed by the processor 125B, to execute one or more steps of the method 1400 described below with reference to FIG. 14. In some embodiments, the anomaly managing client 199 includes code and routines that are operable, when executed by the processor 125B, to execute one or more steps of the example general method described above.

An example embodiment of the anomaly managing client 199 is depicted in FIG. 7. This embodiment is described in more detail below.

In some embodiments, the anomaly managing client 199 is an element of the onboard unit 152 or some other onboard vehicle computer. In some embodiments, the anomaly managing client 199 includes code and routines that are stored in the memory 127B and executed by the processor 125B or the onboard unit 152.

In some embodiments, the anomaly managing client 199 is implemented using hardware including a field-programmable gate array ("FPGA") or an application-specific integrated circuit ("ASIC"). In some other embodiments, the anomaly managing client 199 is implemented using a combination of hardware and software.

The remote vehicle 124 includes elements and functionality which are similar to those described above for the ego vehicle 123, and so, those descriptions will not be repeated here.

In some embodiments, the ego vehicle 123, the remote vehicle 124, and the roadway device 151 are located in a roadway environment 142. The roadway environment 142 is a portion of the real-world that includes a roadway, the ego vehicle 123 and the remote vehicle 124. The roadway environment 142 may include other elements such as the vehicular micro cloud 194, roadway signs, environmental conditions, traffic, etc. The roadway environment 142 includes some or all of the tangible and/or measurable qualities described above with reference to the sensor data.

In some embodiments, the real-world includes the real of human experience comprising physical objects and excludes artificial environments and "virtual" worlds such as computer simulations.

In some embodiments, the roadway environment 142 includes a roadway device 151 that in includes an edge server 104. The edge server 104 is a connected processor-based computing device that is not a member of the vehicular micro cloud 194 and includes an instance of the anomaly managing system 141.

In some embodiments, the edge server 104 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the anomaly managing client 199 and a non-transitory memory that stores some or all of the digital data that is stored by the memory 127 of the ego vehicle 123 or otherwise described herein. In some embodiments, the edge server 104 includes a backbone network.

The edge server 104 includes an instance of the anomaly managing system 141. In some embodiments, the anomaly managing system 141 includes code and routines that are operable, when executed by the processor 125A, to execute one or more steps of the method 300 described below with reference to FIG. 3. In some embodiments, the anomaly managing system 141 includes code and routines that are operable, when executed by the processor 125A, to execute one or more steps of the method 900 described below with reference to FIG. 9. In some embodiments, the anomaly managing system 141 includes code and routines that are operable, when executed by the processor 125A, to execute one or more steps of the method 1400 described below with reference to FIG. 14. In some embodiments, the anomaly managing system 141 includes code and routines that are operable, when executed by the processor 125A, to execute one or more steps of the example general method described above.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadway device 151, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the anomaly managing client 199 includes encryption keys for encrypting wireless messages and decrypting the wireless messages described herein.

In some embodiments, the cloud server 103 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the anomaly managing client 199 and a non-transitory memory that stores some or all of the digital data that is stored by the memory 127 of the ego vehicle 123 or otherwise described herein.

The cloud server 103 includes an instance of the anomaly managing system 141. In some embodiments, the cloud server 103 is a conventional hardware server that is improved by inclusion and execution of the anomaly managing system 141.

Referring now to FIG. 8, depicted is a block diagram illustrating an example computer system 800 including an anomaly managing client 199 according to some embodiments.

In some embodiments, the computer system 800 may include a special-purpose computer system that is programmed to perform one or more steps of one or more of the methods described herein.

In some embodiments, the computer system 800 may include a processor-based computing device. For example, the computer system 200 may include an onboard vehicle computer system of the vehicle 110, the ego vehicle 123, or the remote vehicle 124.

The computer system 200 may include one or more of the following elements according to some examples: the anomaly managing client 199; a processor 125B; a communication unit 145B; a vehicle control system 153; a storage 241; and a memory 127B. The components of the computer system 200 are communicatively coupled by a bus 820.

In some embodiments, the computer system 200 includes additional elements such as those depicted in FIG. 2 as elements of the anomaly managing system 141.

In the illustrated embodiment, the processor 125B is communicatively coupled to the bus 820 via a signal line 837. The communication unit 145B is communicatively coupled to the bus 820 via a signal line 846. The vehicle control system 153 is communicatively coupled to the bus 820 via a signal line 847. The storage 241 is communicatively coupled to the bus 820 via a signal line 842. The memory 127 is communicatively coupled to the bus 820 via a signal line 844. The sensor set 154 is communicatively coupled to the bus 820 via a signal line 848.

In some embodiments, the sensor set 154 includes standard-compliant GPS unit. In some embodiments, the communication unit 145B includes a sniffer.

The following elements of the computer system 800 were described above with reference to FIG. 1, and so, these descriptions will not be repeated here: the processor 125B; the communication unit 145B; the vehicle control system 153; the memory 127B; and the sensor set 154.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the anomaly managing client 199 includes code and routines that are operable, when executed by the processor 125B, to cause the processor 125B to execute one or more steps of the method 300 described herein with reference to FIG. 3. In some embodiments, the anomaly managing client 199 includes code and routines that are operable, when executed by the processor 125B, to cause the processor 125B to execute one or more steps of the method 300 described herein with reference to FIG. 9. In some embodiments, the anomaly managing client 199 includes code and routines that are operable, when executed by the processor 125B, to cause the processor 125B to execute one or more steps of the example general method.

In the illustrated embodiment shown in FIG. 8, the anomaly managing client 199 includes a communication module 802.

The communication module 802 can be software including routines for handling communications between the anomaly managing client 199 and other components of the computer system 800. In some embodiments, the communication module 802 can be a set of instructions executable by the processor 125B to provide the functionality described below for handling communications between the anomaly managing client 199 and other components of the computer system 800. In some embodiments, the communication module 802 can be stored in the memory 127B of the computer system 800 and can be accessible and executable by the processor 125B. The communication module 802 may be adapted for cooperation and communication with the processor 125B and other components of the computer system 800 via signal line 822.

The communication module 802 sends and receives digital data, via the communication unit 145B, to and from one or more elements of the operating environment 100.

In some embodiments, the communication module 802 receives data from components of the anomaly managing client 199 and stores the data in one or more of the storage 241 and the memory 127B.

In some embodiments, the communication module 802 may handle communications between components of the anomaly managing client 199 or the computer system 800.

In the illustrated embodiment shown in FIG. 8, the anomaly managing client 199 includes an analysis module 804. The analysis module 804 is communicatively coupled to the bus 820 via a signal line 824.

Referring now to FIG. 9, depicted is a flowchart of an example method 900. The method 900 includes step 905, step 910, step 915, step 920, and step 925 as depicted in FIG. 9. The steps of the method 900 may be executed in any order, and not necessarily those depicted in FIG. 9. In some embodiments, one or more of the steps are skipped or modified in ways that are described herein or known or otherwise determinable by those having ordinary skill in the art of vehicular micro clouds.

FIGS. 10-13 are related to each other and depict example use cases that demonstrate the functionality of the anomaly management client according to some embodiments.

Figure 10:
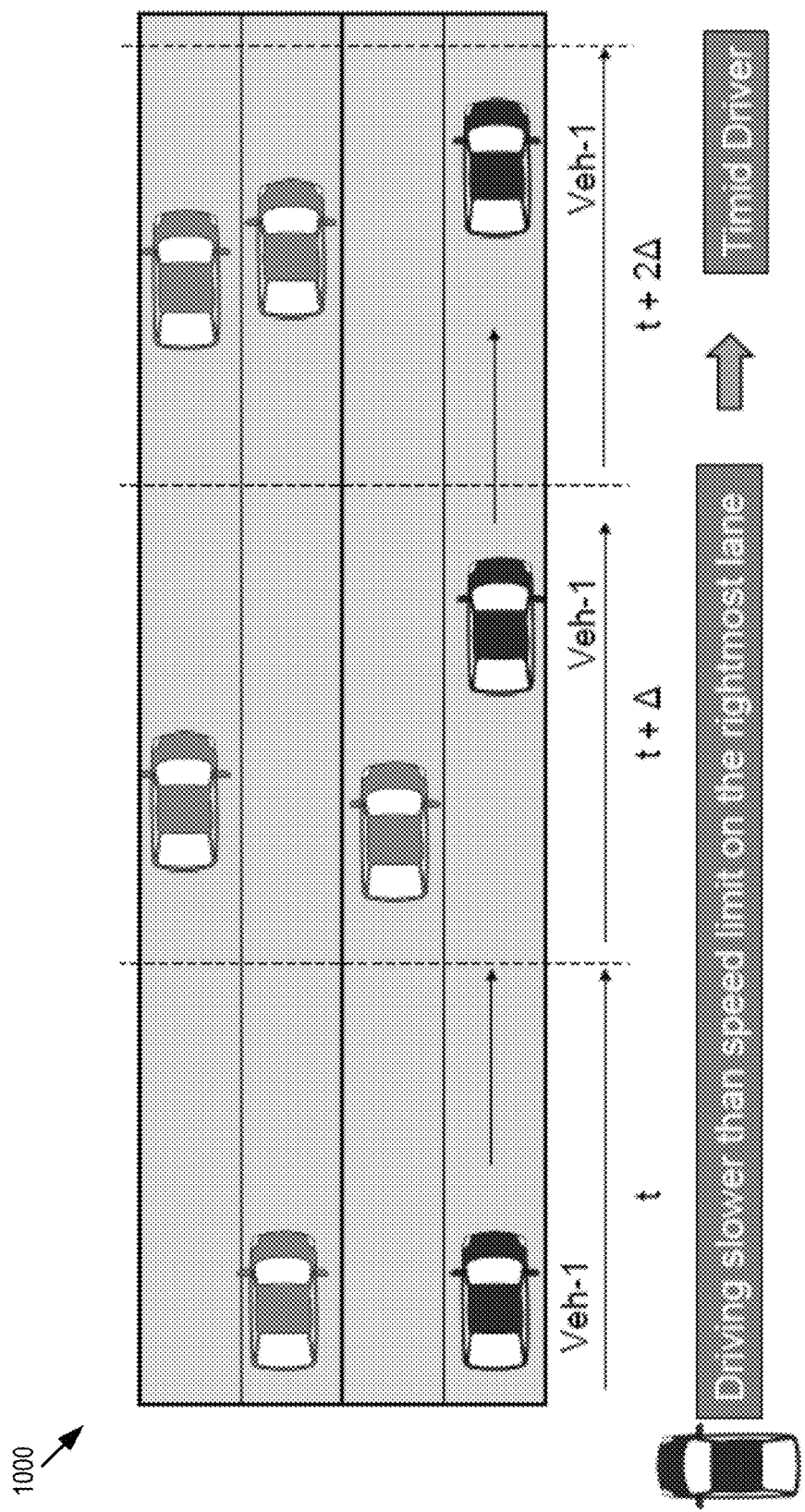
FIG. 10 is a graphical representation illustrating an example use case of an anomaly managing client determining behavior data for a driver of a particular vehicle according to some embodiments.

Referring now to FIG. 10, depicted is a graphical representation illustrating an example use case 1000 of an anomaly managing client determining behavior data for a driver of a particular vehicle according to some embodiments.

In some embodiments, the anomaly managing client tracks and observes the driving actions of vehicles in a roadway environment and actively learns and classifies the sensitivities of the drivers of these vehicles. In the example use case 1000 depicted in FIG. 10, the driver is a classified by the anomaly management system as a timid driver. This is merely an example and not intended to be limiting. Other classifications of sensitivities are possible as described above for the behavior data and the example general method.

Timid drivers require micro level and timely control suggestions. And so, the driving management plan developed by the anomaly management client will be configured accordingly.

In some embodiments, the use case 1000 is an example of determining, by a processor, an ego behavior associated with the ego vehicle and a remote behavior associated with a remote vehicle according to some embodiments.

Figure 11A:
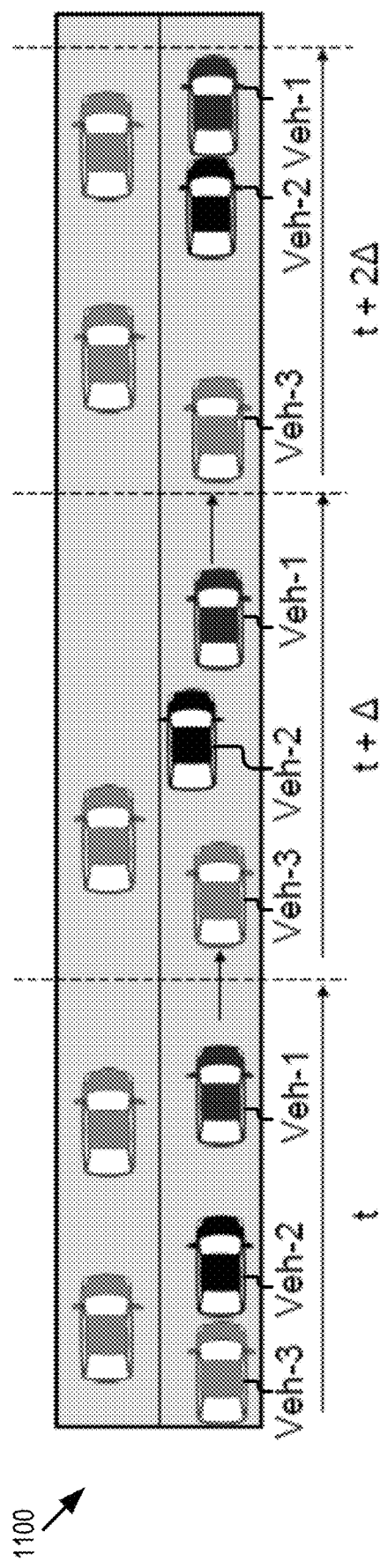
FIG. 11A is a graphical representation illustrating an example use case of an anomaly managing client determining anomaly data for the use case of FIG. 10 according to some embodiments.

Referring now to FIG. 11A, depicted is a graphical representation illustrating an example use case 1100 of an anomaly managing client determining anomaly data for the use case 1000 of FIG. 10 according to some embodiments.

Figure 11B:
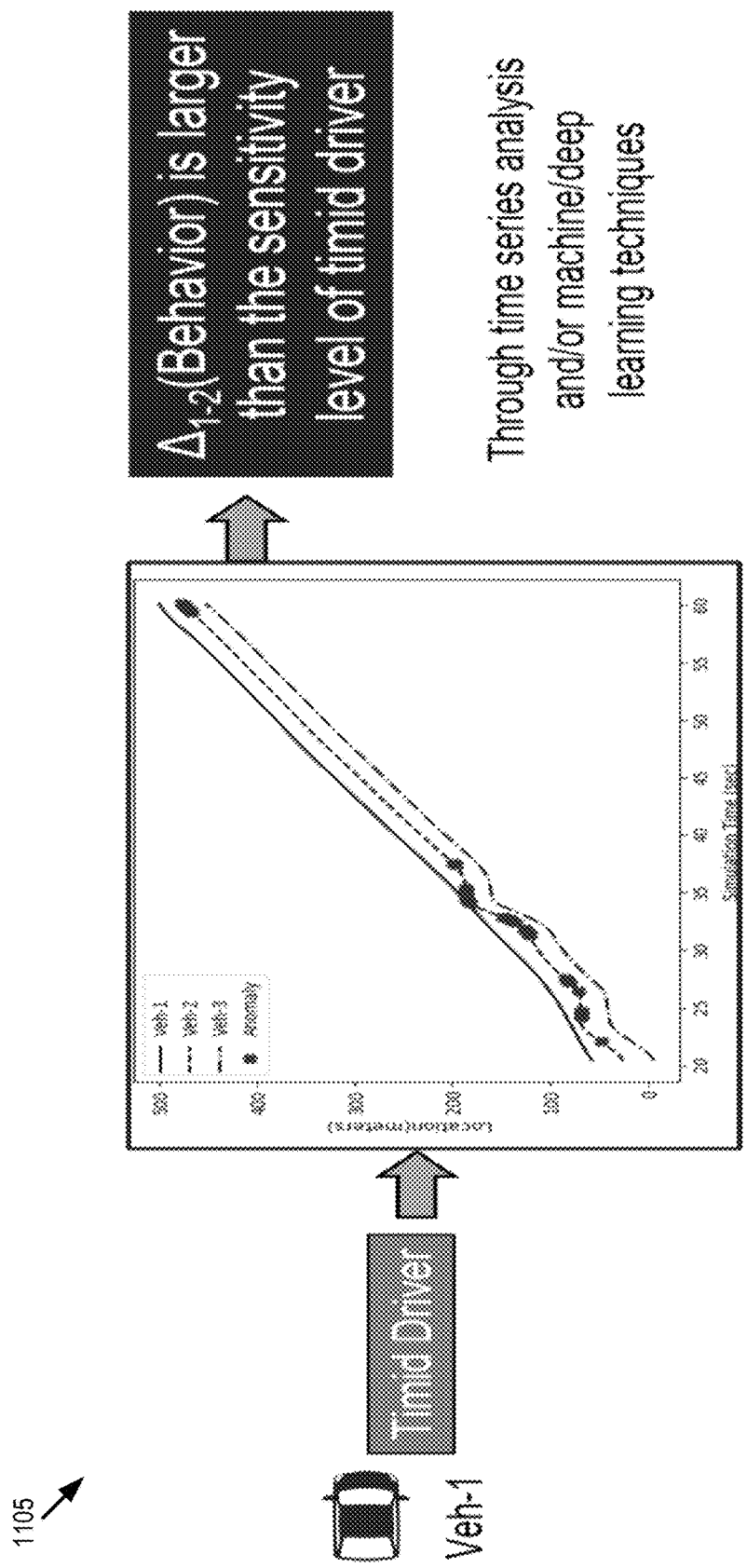
FIG. 11B is a graphical representation illustrating an example use case of an anomaly managing client determining anomaly data for the use cases of FIGS. 10 and 11A according to some embodiments.

Referring now to FIG. 11B is a graphical representation illustrating an example use case 1105 of an anomaly managing client determining anomaly data for the use cases 1000, 1000 of FIGS. 10 and 11A, respectively, according to some embodiments.

The graph depicted in FIG. 11B is describes the use case 1100 depicted in FIG. 11A.

In some embodiments, the use case 1100 and 1105 is an example of calculating a variance between the ego behavior and the remote behavior according to some embodiments.

Figure 12:
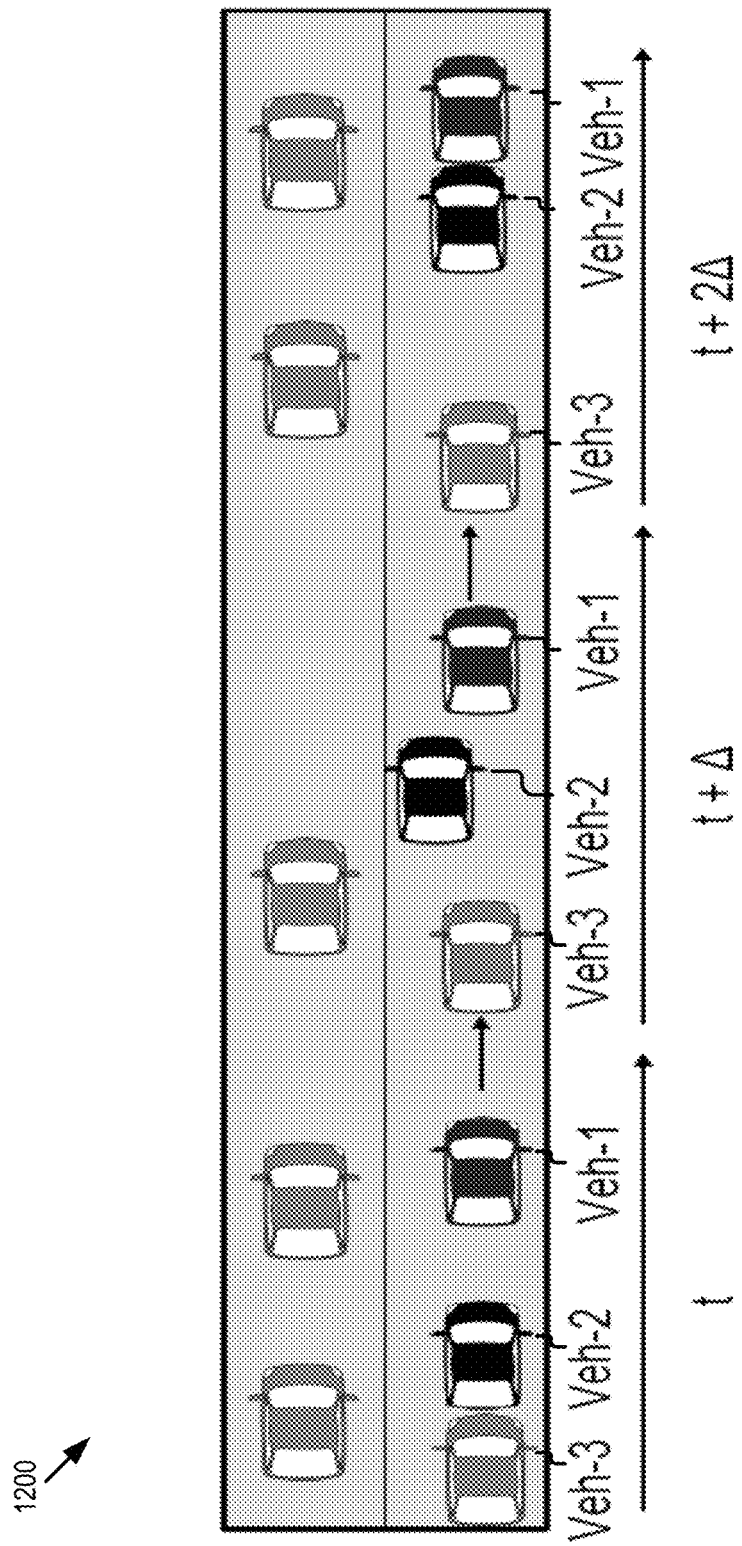
FIG. 12 is a graphical representation illustrating an example use case of an anomaly managing client determining management plan data for the use cases of FIGS. 10, 11A, and 11B according to some embodiments.

Referring now to FIG. 12 is a graphical representation illustrating an example use case 1200 of an anomaly managing client determining management plan data for the use cases 1000, 1100, 1105 of FIGS. 10, 11A, and 11B, respectively, according to some embodiments.

The use case 1105 is an example of a time series analysis executed by the anomaly management client according to some embodiments.

In some embodiments, the anomaly management system includes a machine learning algorithm and the behavior data for each vehicle is determined based on a processor of the ego vehicle executing the machine learning algorithm using the ego sensor data and the remote sensor data as inputs in order to output the behavior data.

In some embodiments, the anomaly management system includes a time series analysis algorithm and the behavior data for each vehicle is determined based on a processor of the ego vehicle executing the time series analysis algorithm using the ego sensor data and the remote sensor data as inputs in order to output the behavior data.

In some embodiments, the anomaly management system includes simulation software and the behavior data for each vehicle is determined based on a processor of the ego vehicle executing a set of digital twin simulations using the ego sensor data and the remote sensor data as inputs in order to output the behavior data.

In some embodiments, the use case 1200 is an example of determining a presence of an anomaly based on the variance satisfying a threshold, wherein the satisfying the threshold indicates the ego behavior is incompatible with the remote behavior.

Figure 13:
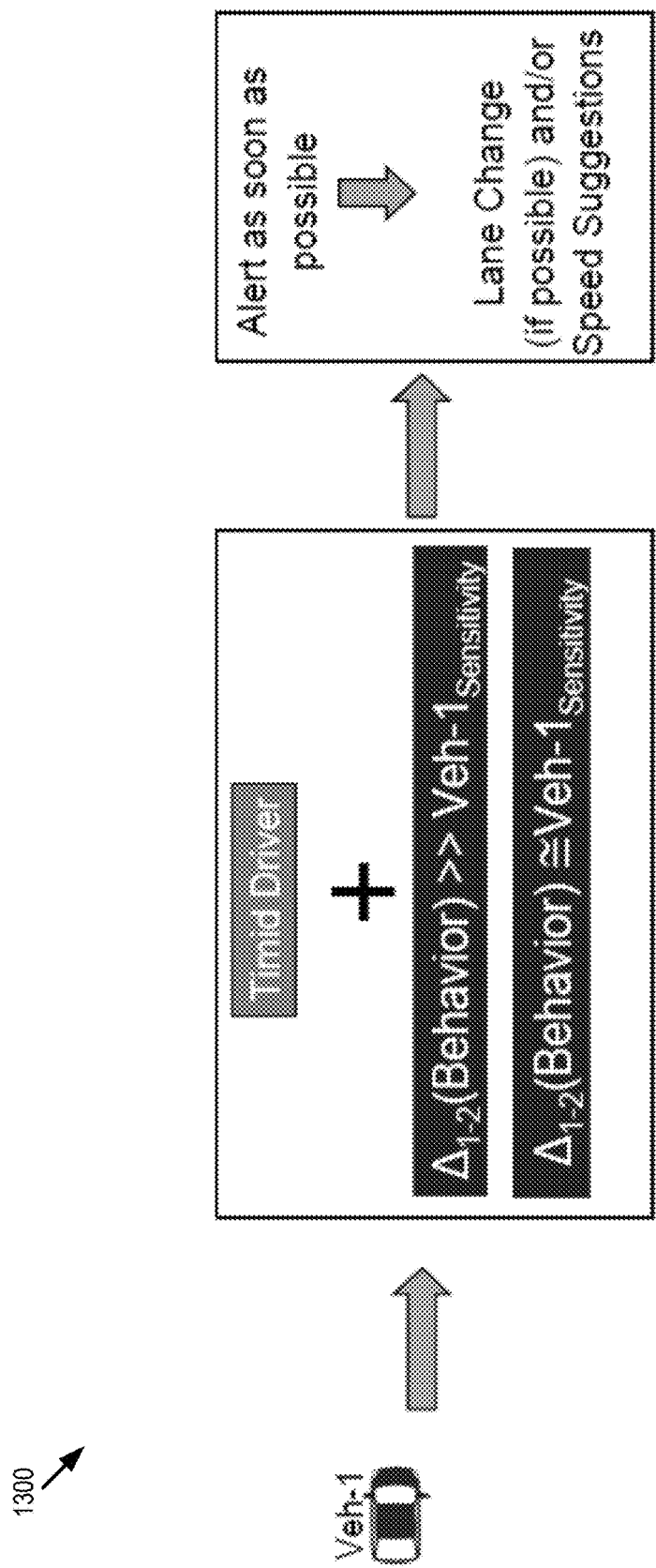
FIG. 13 is a graphical representation illustrating an example use case of an example driving management plan for the use cases of FIGS. 10, 11A, 11B, and 12 according to some embodiments.

Referring now to FIG. 13 is a graphical representation illustrating an example use case 1300 of an example driving management plan for the use cases 1000, 1100, 1105, 1200 of FIGS. 10, 11A, 11B, and 12, respectively, according to some embodiments.

In some embodiments, the use case 1300 includes an analysis of the use case 1200 depicted in FIG. 12.

In some embodiments, the use case 1300 is an example of generating a driving management plan which is configured to mitigate the anomaly In some embodiments, the anomaly management client determines the deviation of the sensitivities of the drivers of the vehicles and uses the magnitude of this deviation as an indicator parameter to classify driving scenarios as anomalous.

In some embodiments, the anomaly management client determines the sensitivities of the drivers of the vehicles and if the deviation among vehicles is larger than the learned behavior levels, the anomaly management client determines to inform the driver with driving maneuvers and timing for these driving maneuvers so that the driver can mitigate the impact of the anomalous behavior.

In some embodiments, the anomaly managing client measures the distance, speed and positions of the ego vehicle and surrounding road participants (possibly non-connected) by using on-board sensors. The distance, speed and positions are observed and tracked over a specified period with regular intervals which constitutes a time series observations. The collected observations are analyzed to infer the sensitivities of drivers. For example, a larger distance to collision is an indication of a more cautious driver. In another example, frequent lane change under congestion is an indication of an impatient driver. In yet another example, driving slower than speed limit on the rightmost lane is an indication of a timid driver (see, e.g., FIGS. 10-13 above).

In some embodiments, the collected observations are analyzed to not only identify the deviated driving behavior but also measure how much driving behavior deviates from the ego vehicle. For example, through time series analysis and/or machine and deep learning techniques. In some embodiments, whenever the deviation between vehicles goes beyond the inferred and/or learned behavior level(s) (e.g., satisfies a threshold), the anomaly management client informs the driver about the abnormal behavior and provide control suggestions to dampen the negative effect of anomalous driving behavior.

For example, the anomaly managing client determines that a cautious driver is followed by an aggressive driver and a determination is made by the anomaly managing client that this satisfies a threshold; this triggers the anomaly managing client to create a driving management plan to mitigate the anomaly.

In another example, the anomaly managing client determines that a timid driver is followed by a distracted driver and a determination is made by the anomaly managing client that this satisfies a threshold; this triggers the anomaly managing client to create a driving management plan to mitigate the anomaly.

Example differences in technical effect between the method 900 and the prior art are described below. These examples are illustrative and not exhaustive of the possible differences.

Existing solutions require the use of vehicle platooning. In some embodiments, a first difference in technical effect is that the existing solutions do not include a vehicular micro cloud. By comparison, embodiments of the perception system use a vehicular micro cloud to provide its functionality. A platoon is not a vehicular micro cloud and does not provide the benefits of a vehicular micro cloud, and some embodiments of the perception system that require a vehicular micro cloud.

Described generally, existing solutions to the problem of roadway environment anomaly management do not include a process that includes: determining the driving capabilities of different drivers (e.g., behavior data), determining that an anomaly is present based on a variance in the driving capabilities of these drivers satisfying a threshold, determining a driving management plan that reduces a negative effect caused by the anomaly and is consistent with the driving capabilities of the driver that executes the driving management plan, and implementing the driving management plan so that the negative effect of the anomaly is reduced.

The existing solutions also do not include vehicle cloudification or vehicular micro-clouds, and so, cannot leverage the use of these types of resources to improve platoon-based behavior of a group of vehicles in a manner which is operable to nullify anomalies.

The existing solutions do not determine a presence of an anomaly based on a detected difference in the behavior data for different drivers that are located on a same roadway. By comparison, the embodiments described herein provide this functionality. The existing solutions also do not generate a driving management plan based on this detected difference. By comparison, the embodiments described herein provide this functionality.

Referring now to FIG. 14, depicted is a method 1400 for mitigating anomalous driving behavior according to some embodiments. The method includes steps 1405, 1410, 1415, 1420, and 1425. In some embodiments, the anomaly managing client includes codes and routines that are operable, when executed by a processor of the ego vehicle, to execute some or all of the steps described herein with reference to the method 1400.

In some embodiments, the memory 127 of the ego vehicle 123 depicted in FIG. 7 stores some or all of the following digital data: behavior data; odometrical driving variance data; threshold data; and management plan data. The memory 127 may also store other digital data depicted or described herein.

In some embodiments, the behavior data includes digital data that describes one or more of the following on a vehicle-by-vehicle basis: a driver sensitivity level (an "ego sensitivity level" for the ego driver of the ego vehicle and a "remote sensitivity level" for the remote driver of the remote vehicle); and a driver's driving capability level (an "ego capability level" for the ego driver of the ego vehicle and a "remote capability level" for the remote driver of the remote vehicle). The behavior data is determined based on analysis of the ego sensor data and, optionally, the remote sensor data. In some embodiments, this analysis is a time-series analysis executed by a time-series algorithm.

The driver sensitivity level (e.g., the ego sensitivity level and/or the remote sensitivity level) describes how a driver would perceive a given anomaly (e.g., whether the driver perceives the anomaly as being serious or unimportant). For example, the ego sensitivity level describes how the ego driver is likely to perceive different types of anomalies based on their past behavior as indicated in the driving log (which is described below).

The driver's driving capability level (e.g., the ego capability level and/or the remote capability level) describes the driver's skill at operating their vehicle. The driver's driving capability level indicates which types of driving maneuvers the driver can execute or not execute. For example, the ego capability level describes which types of driving maneuvers the ego driver of the ego vehicle can and cannot execute.

In some embodiments, the anomaly managing client maintains a driving log. The memory of the ego vehicle stores the driving log. The driving log includes a data structure such as a database. A driving log includes digital data that includes historical sensor measurements about a driver which indicates their driving capability level (e.g., whether they are timid/cautious, aggressive, etc.). The driving log includes historical sensor data previously recorded by the sensor set of the ego vehicle. These sensor measurements describe the ego vehicle and optionally, one or more remote vehicles.

The odometrical driving variance data includes digital data that describes an odometrical driving variance between the ego vehicle and one or more nearby vehicles such as a remote vehicle. The odometrical driving variance describes how the ego driver of the ego vehicle maneuvered and how the remote driver of the remote vehicle maneuvered for a given time of day on the road segment that they are currently driving on. See, e.g., step 1410 of FIG. 14. In other words, the odometrical driving variance describes how different the ego capability level and the ego sensitivity level are from the remote capability level and the remote sensitivity level.

The threshold data includes digital data that describes the threshold which indicates that that odometrical driving variance between the ego vehicle and the one or more remote vehicles is too high. See, e.g., step 1415 of FIG. 14. In some embodiments, the threshold is variable based on one or more of the ego sensitivity level and the remote sensitivity level. For example, if the ego sensitivity level indicates that the ego driver is aggressive, then the threshold is higher than if the ego sensitivity level indicates that the ego driver is timid. In some embodiments, the anomaly managing client includes code and routines that analyzes the driving log and/or the remote sensor data and determines the different thresholds based on one or more of the ego sensitivity level and the remote sensitivity level as indicated by these data sources.

For step 1425, the driving management plan is implemented for example by the ego driver being informed about driving maneuvers to execute in order to reduce a negative impact of the anomaly. The driving maneuvers are configured so that they are within a driving skill level of the ego driver of the ego vehicle.

In some embodiments, the method 1400 includes: analyzing, by a processor of the ego vehicle, a driving log to determine an ego sensitivity level and an ego capability level of an ego driver of the ego vehicle; estimating a remote sensitivity level and a remote capability level of a remote driver of a remote vehicle; calculating an odometrical driving variance between the ego vehicle and the remote vehicle based on the ego sensitivity level, the remote sensitivity level, the ego capability level, and the remote capability level; determining a presence of an anomaly based on the odometrical driving variance satisfying a threshold; and generating a driving management plan that includes a driving maneuver executed by the ego vehicle that is operable to reduce the odometrical driving variance.

In some embodiments, the driving maneuver is within the capability level of the ego driver. In some embodiments, the driving log includes sensor measurements over a period of time for a current road segment driven by the ego vehicle that indicates the ego sensitivity level and the ego capability level. In some embodiments, the remote sensitivity level and the remote capability level are estimated based on sensor measurements recorded by a sensor set of the ego vehicle over a period of time for a road segment that is being traveled by the remote vehicle and the ego vehicle. In some embodiments, one or more of the ego sensitivity level, the remote sensitivity level, the ego capability level, and the remote capability level are determined based on a time series analysis.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by a processor of an ego vehicle, the method comprising:
   determining, by the processor, an ego behavior associated with the ego vehicle and a remote behavior associated with a remote vehicle wherein the ego vehicle and the remote vehicle are proximate to one another in a roadway environment at a particular time;
   wherein the ego behavior describes a first driving pattern of the ego vehicle in the roadway environment at the particular time and the remote behavior describes a second driving pattern of the remote vehicle in the roadway environment at the particular time;
   calculating a variance between the ego behavior and the remote behavior, wherein the variance indicates a difference in the first driving pattern and the second driving pattern;
   determining a presence of an anomaly based on the variance satisfying a threshold, wherein the satisfying the threshold indicates the ego behavior is incompatible with the remote behavior;
   generating a driving management plan which is configured to mitigate the anomaly and is consistent with the ego behavior; and
   implementing the driving management plan so that the threshold is no longer satisfied.

2. The method of claim 1, wherein the first driving pattern describes a driving ability of a first driver of the ego vehicle and the second driving pattern describes the driving ability of a second driver of the remote vehicle and the presence of the anomaly is determined based on the variance in the driving abilities of the first driver and the second driver.

3. The method of claim 1, wherein the first driving pattern describes a first sensitivity of a first driver of the ego vehicle and the second driving pattern describes a second sensitivity of a second driver of the remote vehicle and the presence of the anomaly is determined based on the variance in the first sensitivity and the second sensitivity.

4. The method of claim 1, wherein the ego vehicle is a member of a vehicular micro cloud.

5. The method of claim 1, wherein the first driving pattern and the second driving pattern are determined by the processor executing a machine learning algorithm.

6. The method of claim 1, wherein the first driving pattern and the second driving pattern are determined by the processor executing a time series analysis algorithm.

7. The method of claim 1, wherein the first driving pattern and the second driving pattern are determined by the processor executing a digital twin simulation.

8. The method of claim 1, wherein implementing the driving management plan includes modifying an operation of a vehicle control system of the ego vehicle so that the ego vehicle executes a driving maneuver consistent with the driving management plan and the first driving pattern.

9. A system of an ego vehicle comprising:
   a computer system including a non-transitory memory storing computer code which, when executed by the computer system, causes the computer system to execute steps including:
   determining, by the computer system, an ego behavior associated with the ego vehicle and a remote behavior associated with a remote vehicle wherein the ego vehicle and the remote vehicle are proximate to one another in a roadway environment at a particular time;
   wherein the ego behavior describes a first driving pattern of the ego vehicle in the roadway environment at the particular time and the remote behavior describes a second driving pattern of the remote vehicle in the roadway environment at the particular time;
   calculating a variance between the ego behavior and the remote behavior, wherein the variance indicates a difference in the first driving pattern and the second driving pattern;
   determining a presence of an anomaly based on the variance satisfying a threshold, wherein the satisfying the threshold indicates the ego behavior is incompatible with the remote behavior;
   generating a driving management plan which is configured to mitigate the anomaly and is consistent with the ego behavior; and
   implementing the driving management plan so that the threshold is no longer satisfied.

10. The system of claim 9, wherein the first driving pattern describes a driving ability of a first driver of the ego vehicle and the second driving pattern describes the driving ability of a second driver of the remote vehicle and the presence of the anomaly is determined based on the variance in the driving abilities of the first driver and the second driver.

11. The system of claim 9, wherein the first driving pattern describes a first sensitivity of a first driver of the ego vehicle and the second driving pattern describes a second sensitivity of a second driver of the remote vehicle and the presence of the anomaly is determined based on the variance in the first sensitivity and the second sensitivity.

12. The system of claim 9, wherein the ego vehicle is a member of a vehicular micro cloud.

13. The system of claim 9, wherein the first driving pattern and the second driving pattern are determined by the computer system executing a machine learning algorithm.

14. The system of claim 9, wherein the first driving pattern and the second driving pattern are determined by the computer system executing a time series analysis algorithm.

15. The system of claim 9, wherein the first driving pattern and the second driving pattern are determined by the computer system executing a digital twin simulation.

16. A method comprising:
    analyzing, by a processor of an ego vehicle, a digital data to determine an ego sensitivity level and an ego capability level of an ego driver of the ego vehicle;
    estimating a remote sensitivity level and a remote capability level of a remote driver of a remote vehicle;
    calculating an odometrical driving variance between the ego vehicle and the remote vehicle based on one or more of the ego sensitivity level, the remote sensitivity level, the ego capability level, and the remote capability level;

determining a presence of an anomaly based at least in part on the odometrical driving variance; and generating a plan that includes a driving maneuver executed by the ego vehicle that is operable to modify the odometrical driving variance.

17. The method of claim 16, wherein the driving maneuver is within the capability level of the ego driver.

18. The method of claim 16, wherein the digital data includes sensor measurements over a period of time for a current road segment driven by the ego vehicle that indicates the ego sensitivity level and the ego capability level.

19. The method of claim 16, wherein the remote sensitivity level and the remote capability level are estimated based on sensor measurements recorded by a sensor set of the ego vehicle over a period of time for a road segment that is being traveled by the remote vehicle and the ego vehicle.

20. The method of claim 16, wherein one or more of the ego sensitivity level, the remote sensitivity level, the ego capability level, and the remote capability level are determined based on a time series analysis.

* * * * *